United States Patent [19]
Stoevhase

[11] Patent Number: 6,014,715
[45] Date of Patent: Jan. 11, 2000

[54] METHOD AND APPARATUS FOR ASSIGNING PORT ADDRESSES

[75] Inventor: Bent Stoevhase, Toronto, Canada

[73] Assignee: McDATA Corporation, Broomfield, Colo.

[21] Appl. No.: 09/026,629

[22] Filed: Feb. 20, 1998

Related U.S. Application Data

[63] Continuation of application No. 08/336,396, Nov. 8, 1994, Pat. No. 5,805,924.

[51] Int. Cl.[7] .................................................. G06F 13/00
[52] U.S. Cl. ............................... 710/11; 710/10; 710/16; 709/227
[58] Field of Search ............. 395/200.1, 200.12–200.17, 395/828–830, 835, 284, 800.01, 856–858, 862, 500, 527; 370/58.2, 85.1, 85.4; 710/86, 17, 18; 709/227–229

[56] References Cited

U.S. PATENT DOCUMENTS

| | | | |
|---|---|---|---|
| 5,126,999 | 6/1992 | Munter et al. | 370/415 |
| 5,130,975 | 7/1992 | Akata | 370/416 |
| 5,136,582 | 8/1992 | Firoozmand | 370/400 |
| 5,185,736 | 2/1993 | Tyrell et al. | 370/358 |
| 5,247,626 | 9/1993 | Firoozmand | 709/212 |
| 5,255,266 | 10/1993 | Wantanabe et al. | 370/233 |
| 5,291,481 | 3/1994 | Doshi et al. | 370/394 |
| 5,313,582 | 5/1994 | Hendel et al. | 710/56 |
| 5,357,506 | 10/1994 | Sugawara | 370/392 |
| 5,365,522 | 11/1994 | Peeters | 370/397 |
| 5,384,773 | 1/1995 | Olnowich et al. | 370/358 |
| 5,390,184 | 2/1995 | Morris | 370/353 |
| 5,418,779 | 5/1995 | Yemini et al. | 370/256 |
| 5,436,894 | 7/1995 | Wallmeier et al. | 370/399 |
| 5,583,991 | 12/1996 | Chatwani et al. | 395/200.01 |
| 5,638,518 | 6/1997 | Malladi | 395/200.21 |
| 5,644,712 | 7/1997 | Coscarella et al. | 395/200.01 |
| 5,671,441 | 9/1997 | Glassen et al. | 395/828 |

*Primary Examiner*—Ayaz R. Sheikh
*Assistant Examiner*—Raymond N. Phan
*Attorney, Agent, or Firm*—William J. Kubida, Esq.

[57] ABSTRACT

A method and apparatus for configuring a system that includes a plurality of interconnected components that each supports service parameters for communicating with other components in the system. A determination is made as to which components support service parameters that are compatible, and groups of components having compatible service parameters are identified. Adjacent components exchange information frames that identify their service parameters. Each component compares its service parameters with those of its adjacent components to determine whether they are compatible, updating its own service parameters if necessary. Any component that updates its service parameters issues another information frame. Thus, information frames are exchanged until it is determined which components support compatible service parameters, and what service parameters are to be used for communicating among those components. Additionally, a unique address is automatically assigned to every port in the system. Control over the entire range of available addresses is initially granted to a master component, which assigns unique addresses to its own ports, and then relinquishes control over ranges of addresses to other components which each becomes the managers of the addresses over which it is granted control. Each address manager assigns unique addresses to its ports, and if any extra addresses are available, relinquishes control over those extra addresses to another component.

6 Claims, 24 Drawing Sheets

| SERVICE PARAMETERS FOR RESPONDER | SERVICE PARAMETERS FOR REQUESTER | |
|---|---|---|
| | MAX. R_A_TOV A1 | |
| | CONDITION | RESULT |
| MAX. R_A_TOV (B1) | B1>A1 | B1<=A1 |
| | B1=A1 | B1<=B1 |
| | B1<A1 | B1<=B1 |
| MIN. R_A_TOV (B2) | B2>A1 | REJECT |
| | B2=A1 | ACCEPT |
| | B2<A1 | ACCEPT |
| MAX. E_D_TOV (B3) | B3>A1 | REJECT |
| | B3=A1 | REJECT |
| | B3<A1 | ACCEPT |
| MIN. E_D_TOV (B4) | B4>A1 | REJECT |
| | B4=A1 | REJECT |
| | B4<A1 | ACCEPT |
| MRTT (B5) | 2B5>A1 | REJECT |
| | 2B5=A1 | REJECT |
| | 2B5<A1 | ACCEPT |

*FIG. 3A*

| SERVICE PARAMETERS FOR RESPONDER | SERVICE PARAMETERS FOR REQUESTER | |
| --- | --- | --- |
| | MIN. R_A_TOV A2 | |
| | CONDITION | RESULT |
| MAX. R_A_TOV (B1) | B1>A2 | ACCEPT |
| | B1=A2 | ACCEPT |
| | B1<A2 | REJECT |
| MIN. R_A_TOV (B2) | B2>A2 | B2<=B2 |
| | B2=A2 | B2<=B2 |
| | B2<A2 | B2<=A2 |
| MAX. E_D_TOV (B3) | B3>A2 | ? |
| | B3=A2 | ? |
| | B3<A2 | ACCEPT |
| MIN. E_D_TOV (B4) | B4>A2 | REJECT |
| | B4=A2 | REJECT |
| | B4<A2 | ACCEPT |
| MRTT (B5) | 2B5>A2 | REJECT |
| | 2B5=A2 | REJECT |
| | 2B5<A2 | ACCEPT |

*FIG. 3B*

| SERVICE PARAMETERS FOR RESPONDER | SERVICE PARAMETERS FOR REQUESTER | |
| --- | --- | --- |
| | MAX. E_D_TOV A3 | |
| | CONDITION | RESULT |
| MAX. R_A_TOV (B1) | B1>A3 | ACCEPT |
| | B1=A3 | REJECT |
| | B1<A3 | REJECT |
| MIN. R_A_TOV (B2) | B2>A3 | ACCEPT |
| | B2=A3 | ? |
| | B2<A3 | ? |
| MAX. E_D_TOV (B3) | B3>A3 | B3<=A3 |
| | B3=A3 | B3<=B3 |
| | B3<A3 | B3<=B3 |
| MIN. E_D_TOV (B4) | B4>A3 | REJECT |
| | B4=A3 | ACCEPT |
| | B4<A3 | ACCEPT |
| MRTT (B5) | 2B5>A3 | REJECT |
| | 2B5=A3 | REJECT |
| | 2B5<A3 | ACCEPT |

*FIG. 4A*

| SERVICE PARAMETERS FOR RESPONDER | SERVICE PARAMETERS FOR REQUESTER | |
|---|---|---|
| | MIN. E_D_TOV A4 | |
| | CONDITION | RESULT |
| MAX. R_A_TOV (B1) | B1>A4 | ACCEPT |
| | B1=A4 | REJECT |
| | B1<A4 | REJECT |
| MIN. R_A_TOV (B2) | B2>A4 | ACCEPT |
| | B2=A4 | REJECT |
| | B2<A4 | REJECT |
| MAX. E_D_TOV (B3) | B3>A4 | ACCEPT |
| | B3=A4 | ACCEPT |
| | B3<A4 | REJECT |
| MIN. E_D_TOV (B4) | B4>A4 | B4<=B4 |
| | B4=A4 | B4<=B4 |
| | B4<A4 | B4<=A4 |
| MRTT (B5) | 2B5>A4 | ? |
| | 2B5=A4 | ACCEPT |
| | 2B5<A4 | ACCEPT |

*FIG. 4B*

| SERVICE PARAMETERS FOR RESPONDER | SERVICE PARAMETERS FOR REQUESTER | |
|---|---|---|
| | MRTT A5 | |
| | CONDITION | RESULT |
| MAX. R_A_TOV (B1) | B1>2A5 | ACCEPT |
| | B1=2A5 | REJECT |
| | B1<2A5 | REJECT |
| MIN. R_A_TOV (B2) | B2>2A5 | ACCEPT |
| | B2=2A5 | REJECT |
| | B2<2A5 | REJECT |
| MAX. E_D_TOV (B3) | B3>2A5 | ACCEPT |
| | B3=2A5 | REJECT |
| | B3<2A5 | REJECT |
| MIN. E_D_TOV (B4) | B4>2A5 | ACCEPT |
| | B4=2A5 | ACCEPT |
| | B4<2A5 | ? |
| MRTT (B5) | B5>A5 | B5<=B5 |
| | B5=A5 | B5<=B5 |
| | B5<A5 | B5<=A5 |

*FIG. 5*

| SERVICE PARAMETERS FOR RESPONDER | SERVICE PARAMETERS FOR REQUESTER | |
|---|---|---|
| | MAX. DATA_FIELD_SIZE A1 | |
| | CONDITION | RESULT |
| MAXIMUM DATA_FIELD_SIZE (B1) | B1>A1 | B1<=A1 |
| | B1=A1 | B1<=B1 |
| | B1<A1 | B1<=B1 |
| MINIMUM DATA_FIELD_SIZE (B2) | B2>A1 | REJECT |
| | B2=A1 | ACCEPT |
| | B2<A1 | ACCEPT |

*FIG. 6A*

| SERVICE PARAMETERS FOR RESPONDER | SERVICE PARAMETERS FOR REQUESTER | |
|---|---|---|
| | MIN. DATA_FIELD_SIZE A2 | |
| | CONDITION | RESULT |
| MAXIMUM DATA_FIELD_SIZE (B1) | B1>A2 | ACCEPT |
| | B1=A2 | ACCEPT |
| | B1<A2 | REJECT |
| MINIMUM DATA_FIELD_SIZE (B2) | B2>A2 | B2<=B2 |
| | B2=A2 | B2<=B2 |
| | B2<A2 | B2<=A2 |

*FIG. 6B*

| REGION SERVICE PRIORITY LEVEL | | DESCRIPTION |
|---|---|---|
| (E) | (e) | |
| 0 | 0 | SERVICE OPTION NOT SUPPORTED |
| 0 | 1 | SERVICE OPTION SUPPORTED ONLY IF ALL FABRIC ELEMENTS IN THE REGION SUPPORT THE SERVICE |
| 1 | 0 | SERVICE OPTION SUPPORTED, EVEN IF THIS LEADS TO A REGION SPLIT, BUT NOT IF IT LEADS TO A SPLIT FABRIC |
| 1 | 1 | SERVIE OPTION SUPPORTED, EVEN IF THIS LEADS TO A SPLIT FABRIC |

*FIG. 8A*

| REGION SERVICE PRIORITY LEVEL FOR RESPONDER (Ee) | REGION SERVICE PRIORITY LEVEL FOR REQUESTER (Ee) | | | |
|---|---|---|---|---|
| | 00 | 01 | 10 | 11 |
| 00 | 00 | 00 | 00 | 00 |
| 01 | 00 | 01 | 10 | 11 |
| 10 | 00 | 10 | 10 | 11 |
| 11 | 00 | 11 | 11 | 11 |

*FIG. 8B*

| BIT | DESCRIPTION | CLASS | | | |
|---|---|---|---|---|---|
| | | 1 | 2 | 3 | 4 |
| 31 | CLASS VALIDITY | Y | Y | Y | Y |
| 30 | TRANSPARENT STACKED CONNECT | Y | N | N | N |
| 29 | LOCK-DOWN STACKED CONNECT | Y | N | N | N |
| 28 | GLOBAL SEQUENTIAL DELIVERY | N | Y | Y | N |
| 27 | SELECTIVE SEQUENTIAL DELIVERY | N | Y | Y | N |
| 26 | RESERVED | - | - | - | - |
| 25 | RESERVED | - | - | - | - |
| 24 | RESERVED | - | - | - | - |
| 23 | SELF ROUTING | Y | Y | Y | Y |
| 22 | SUPERVISED ROUTING | Y | Y | Y | Y |
| 21 | UNRESTRICTED ROUTING | Y | Y | Y | Y |
| 20 | ADMINISTRATIVE ADDRESSING | Y | Y | Y | Y |
| 19 | AUTOMATIC ADDRESSING | Y | Y | Y | Y |
| 18 | DIRECT ADDRESSING | Y | Y | Y | Y |
| 17 | UNCONSTRAINED ADDRESSING | Y | Y | Y | Y |
| 16 | RESERVED | - | - | - | - |

*FIG. 9*

| WORD | BIT 33222222222211111111119876543210 10987654321098765432109876543210 | | | |
|---|---|---|---|---|
| 0 | RESERVED<br>r r r r r r r r | RESERVED<br>r r r r r r r r | FABRIC NAME PRIORITY<br>p p p p p p p p | SUBFABRIC ID<br>s s s s s s s s |
| 1 | FABRIC NAME (BITS 63...62)<br>f f f f f f f f f f f f f f f f f f f f f f f f f f f f f f f f | | | |
| 2 | FABRIC NAME (BITS 31...0)<br>f f f f f f f f f f f f f f f f f f f f f f f f f f f f f f f f | | | |
| 3 | MAXIMUM R_A_TOV LIMIT<br>T T T T T T T T T T T T T T T T T T T T T T T T T T T T T T T T | | | |
| 4 | MINIMUM R_A_TOV LIMIT<br>t t t t t t t t t t t t t t t t t t t t t t t t t t t t t t t t | | | |
| 5 | MAXIMUM E_D_TOV LIMIT<br>T T T T T T T T T T T T T T T T T T T T T T T T T T T T T T T T | | | |
| 6 | MINIMUM E_D_TOV LIMIT<br>t t t t t t t t t t t t t t t t t t t t t t t t t t t t t t t t | | | |
| 7 | MAXIMUM ROUND TRIP TIME (MRTT)<br>T T T T T T T T T T T T T T T T T T T T T T T T T T T T T T T T | | | |
| 8 | RESERVED<br>r r r r r r r r | RESERVED<br>r r r r r r r r | RESERVED<br>r r r r r r r r | RESERVED<br>r r r r r r r r |
| 9 | RESERVED<br>r r r r r r r r | RESERVED<br>r r r r r r r r | MAXIMUM BUFFER-TO-BUFFER RECEIVE DATA FIELD SIZE<br>r r r r B B B B B B B B 0 0 | |
| 10 | RESERVED<br>r r r r r r r r | RESERVED<br>r r r r r r r r | MINIMUM BUFFER-TO-BUFFER RECEIVE DATA FIELD SIZE<br>r r r r b b b b b b b b 0 0 | |

*FIG. 10A*

| WORD | BIT 33222222222211111111119876543210<br>10987654321098765432109876543210 | | | |
|---|---|---|---|---|
| 0 | REQUIRED SEVICE OPTIONS<br>E E E E E E E E E E | | MAXIMUM BUFFER-TO-BUFFER RECEIVE DATA FIELD SIZE<br>r r r r B B B B B B B B 0 0 | |
| 1 | SUPPORTED SEVICE OPTION<br>e e e e e e e e e e | | MINIMUM BUFFER-TO-BUFFER RECEIVE DATA FIELD SIZE<br>r r r r b b b b b b b b 0 0 | |
| 2 | ROUTING METHOD<br>M M M M | ADDRESS ASSIGNMENT METHOD<br>A A A A | REGION NAME PRIORITY<br>p p p p p p | SF_ID<br>s s s s s s |
| 3 | REGION NAME (BITS 63...32)<br>f f f f f f f f f f f f f f f f f f f f f f f f f f f f f f f f | | | |
| 4 | REGION NAME (BITS 31...0)<br>f f f f f f f f f f f f f f f f f f f f f f f f f f f f f f f f | | | |

*FIG. 10B*

| SF_ID BITS | | | | | | | |
|---|---|---|---|---|---|---|---|
| 7 | 6 | 5 | 4 | 3 | 2 | 1 | 0 |
| R[1] | R[1] | R[1] | R[1] | C[2] | C[2] | C[2] | C[2] |

NOTES
  1 DATA RATES (BITS 7..4)
    0000  132,812 5 MBAUD
    0001  265,625 MBAUD
    0010  531,25 MBAUD
    0011  1 062,5 MBAUD
    OTHERS RESERVED
  2 CLASS OF SERVICE (BITS 3..0)
    0000  CLASS F
    0001  CLASS 1
    0010  CLASS 2
    0011  CLASS 3
    0100  CLASS 4
    OTHERS RESERVED

*FIG. 10C*

| FIG. 12A |
|----------|
| FIG. 12B |
| FIG. 12C |

*FIG. 12*

| ADDRESS PARTITIONING | | |
|---|---|---|
| ADDRESS BITS | | DESCRIPTION |
| 23 - - | - - 0 | |
| 00000000 00000000 | 00000000 | UNIDENTIFIED (1) |
| 00000000 00000000 | 00000001 | RESERVED (1) |
| 00000000 00000000 | 0000001x | RESERVED (2) |
| 00000000 00000000 | 000001xx | RESERVED (4) |
| 00000000 00000000 | 00001xxx | RESERVED (8) |
| 00000000 00000000 | 0001xxxx | RESERVED (16) |
| 00000000 00000000 | 001xxxxx | RESERVED (32) |
| 00000000 00000000 | 01xxxxxx | RESERVED (64) |
| 00000000 00000000 | 1xxxxxxx | RESERVED (128) |
| 00000000 00000001 | xxxxxxxx | RESERVED (256) |

*FIG. 12A*

| | | | |
|---|---|---|---|
| 00000000 | 0000001x | | RESERVED (512) |
| 00000000 | 000001xx | | RESERVED (1 024) |
| 00000000 | 00001xxx | | RESERVED (2 048) |
| 00000000 | 0001xxxx | | RESERVED (4 096) |
| 00000000 | 001xxxxx | | RESERVED (8 192) |
| 00000000 | 01xxxxxx | | RESERVED (16 384) |
| 00000000 | 1xxxxxxx | | RESERVED (32 768) |
| (DOMAIN_ID) | (AREA_ID) | (PORT_ID) | PORT IDENTIFIERS (14 684 160) |
| (DOMAIN_ID) | 1111 ( SPECIAL_ID ) | | FABRIC ASSISTED FUNCTIONS (978 946) |
| 11110xxx | xxxxxxxx | xxxxxxxx | RESERVED (524 288) |
| 111110xx | xxxxxxxx | xxxxxxxx | RESERVED (262 144) |
| 1111110x | xxxxxxxx | xxxxxxxx | RESERVED (131 072) |
| 11111110 | xxxxxxxx | xxxxxxxx | RESERVED (65 536) |
| 11111111 | 0xxxxxxx | xxxxxxxx | RESERVED (32 768) |
| 11111111 | 10xxxxxx | xxxxxxxx | RESERVED (16 384) |
| 11111111 | 110xxxxx | xxxxxxxx | RESERVED (8 192) |
| 11111111 | 1110xxxx | xxxxxxxx | RESERVED (4 096) |
| 11111111 | 11110xxx | xxxxxxxx | RESERVED (2 048) |
| 11111111 | 111110xx | xxxxxxxx | RESERVED (512) |
| 11111111 | 11111010 | xxxxxxxx | RESERVED (256) |
| 11111111 | 11111011 | xxxxxxxx | VENDOR UNIQUE (256) |

*FIG. 12B*

| | | | |
|---|---|---|---|
| 11111111 | 11111100 | 00000000 | RESERVED (1) |
| 11111111 | 11111100 | (DOMAIN_ID) | DOMAIN ADDRESS MANAGERS (239) |
| 11111111 | 11111100 | 1111xxxx | VENDOR UNIQUE (16) |
| 11111111 | 11111101 | (AREA_ID) | AREA ADDRESS MANAGERS FOR 'THIS' DOMAIN (240) |
| 11111111 | 11111101 | 1111xxxx | VENDOR UNIQUE (16) |
| 11111111 | 11111110 | (PORT_ID) | AREA ADDRESS MANAGERS FOR 'THIS' DOMAIN (256) |
| 11111111 | 11111111 | 0xxxxxxx | VENDOR UNIQUE (128) |
| 11111111 | 11111111 | 10xxxxxx | RESERVED FOR FC-EP (64) |
| 11111111 | 11111111 | 110xxxxx | RESERVED FOR FC-EP (32) |
| 11111111 | 11111111 | 1110xxxx | RESERVED FOR FC-EP (16) |
| 11111111 | 11111111 | 11110xxx | RESERVED FOR FC-PH (8) |
| 11111111 | 11111111 | 111100x | RESERVED FOR FC-PH (2) |
| 11111111 | 11111111 | 11111010 | MANAGEMENT SERVER (1) |
| 11111111 | 11111111 | 11111011 | TIME SERVER (1) |
| 11111111 | 11111111 | 11111100 | NAME SERVER (1) |
| 11111111 | 11111111 | 11111101 | FABRIC CONTROLLER (1) |
| 11111111 | 11111111 | 11111110 | F_PORT (1) |
| 11111111 | 11111111 | 11111111 | RESERVED FOR BROADCAST (1) |

*FIG. 12C*

| CONDITION | RECIPIENT ACTION |
|---|---|
| VN FRAME TIME < SERVICE PARAMETER TIME | NONE |
| VN FRAME TIME = SERVICE PARAMETER TIME AND (VN FRAME DISTANCE +1) ≥ SERVICE PARAMETER DISTANCE | NONE |
| VN FRAME TIME = SERVICE PARAMETER TIME AND (VN FRAME DISTANCE +1) < SERVICE PARAMETER DISTANCE | SERVICE PARAMETER TIME <= VN FRAME TIME<br><br>SERVICE PARAMETER DISTANCE <= VN FRAME DISTANCE +1<br><br>RETRANSMITTED VN FRAMES WITH UPDATED SERVICE PARAMETERS ARE SENT ON ALL IEL IF THE ID IN THE VN FRAME IS THE F_ID, OTHERWISE IT IS SENT ONLY ON IELS PART OF THE REGION IDENTIFIED IN THE VN FRAMES ID FIELD. |
| VN FRAME TIME > SERVICE PARAMETER TIME | SERVICE PARAMETER TIME <= VN FRAME TIME<br><br>SERVICE PARAMETER DISTANCE <= VN FRAME DISTANCE +1<br><br>RETRANSMITTED VN FRAMES WITH UPDATED SERVICE PARAMETERS ARE SENT ON ALL IEL IF THE ID IN THE VN FRAME IS THE F_ID, OTHERWISE IT IS SENT ONLY ON IELS PART OF THE REGION IDENTIFIED IN THE VN FRAMES ID FIELD. |

*FIG. 15*

METHOD AND APPARATUS FOR ASSIGNING PORT ADDRESSES

This application is a continuation of Ser. No. 08/336,396, filed Nov. 8, 1994, now U.S. Pat. No. 5,805,924.

FIELD OF THE INVENTION

This invention relates to the configuration of fabrics within a Fibre Channel system. More particularly, this invention provides a method and apparatus for distributing service parameters among a number of fibre channel switching elements to determine and define the configuration of a Fibre Channel system, and for partitioning addresses among a plurality of ports in the system.

BACKGROUND DISCUSSION

Computers and computer peripherals (collectively "devices") generally include at least one input/output (I/O) channel that allows communication with other devices. Traditional I/O channels support only a single protocol (e.g., SCSI, IPI, proprietary protocols, etc.). Thus, to provide a computer or peripheral with the ability to communicate with other devices using multiple protocols, multiple I/O channels were traditionally required, each having hardware to support its associated protocol. Often, the hardware necessary to support even a single protocol can be significant in terms of both cost and physical space. Thus, the use of multiple I/O channels is disadvantageous.

Fibre Channel is a computer-to-peripheral or computer-to-computer multi-protocol networked I/O channel that has been proposed to overcome the disadvantages associated with using multiple single-protocol I/O channels. An interface standard for Fibre Channel has been proposed by the American National Standard for Information Systems, and a working draft, which is incorporated herein by reference, is entitled FIBRE CHANNEL-PHYSICAL AND SIGNALLING INTERFACE, rev. 4.3, Jun. 1, 1994 (hereafter "FC-PH"). Fibre Channel specifies a variety of communication protocols, data rates and physical media interface types (e.g., optical, coaxial, twisted pair wires) to meet the needs of peripheral and computing devices in their support of multiple I/O protocols.

Fibre Channel supports a number of different topologies, each defining the manner in which a system of devices can be networked together. These topologies include, for example, direct one-to-one connection between two devices, a loop topology, and a fabric topology. A fabric is a network of switches for interconnecting a plurality of devices without restriction as to the manner in which the switches can be arranged, and can include a mixture of other topology types.

Because Fibre Channel sought to support multiple communication protocols and a fabric topology, problems were encountered that had not been faced with conventional networks and I/O channels. Fibre Channel allows the interconnection of multiple switches, each potentially supporting multiple protocols, in an unrestricted fashion in a single system. Thus, the potential exists in Fibre Channel for two or more devices to be connected to the same system, despite the fact that they cannot communicate because they are incompatible. For example, two devices may be incompatible because they cannot support a common data rate or data frame size for communicating therebetween. Thus, a technique was needed to determine which switches and devices could communicate with one another in a Fibre Channel system, and which could not.

Furthermore, because multiple communication protocols are supported by Fibre Channel, some technique needed to be developed to determine what service parameters would be used by the switches and devices in any system that were compatible, to ensure that each used common service parameters during inter-device communication.

Fibre Channel supports automatic address assignment wherein each fabric automatically assigns a unique address to each port in the fabric. Thus, some technique also needed to be developed for partitioning addresses among a plurality of switch and device ports in a Fibre Channel system.

The present invention is directed to a method and apparatus for solving the above-described problems.

SUMMARY OF THE INVENTION

The foregoing problems are overcome in one illustrative embodiment of the invention in which a method and apparatus are provided for configuring a system that includes a plurality of interconnected components, each component supporting service parameters used in communicating with other components in the system, the plurality of components including at least two components whose service parameters differ. A determination is made as to which components support service parameters that are compatible for communication across the system, and groups of components that have compatible service parameters are identified.

In another illustrative embodiment of the invention, the determination as to which components support compatible service parameters is made by exchanging information frames between components that are adjacent one another in the system, the information frames identifying the service parameters of the components. Each component compares its service parameters with those of its adjacent components to determine whether they are compatible, updating its own service parameters if necessary. Whenever a component's service parameters are updated as a result of a comparision with those of another component, the updating component issues another information frame identifying its updated service paramters. In this manner, information frames are exchanged between adjacent components until a determination is made as to which components in the system support compatible service parameters, and as to what service parameters will be used for communicating among those components.

In a further illustrative embodiment of the invention, a method and apparatus are provided for automatically assigning a unique address to every port in a system that includes a plurality of interconnected components, each component having at least one port, the unique addresses being selected from a range of available addresses. Control over assignment of the entire range of available addresses is initially granted to a single master component. The master component assigns unique addresses to each of its own ports, and then relinguishes control over ranges of addresses to other components, which then become the managers of the addresses over which they are granted control by the master. Each component that acts as an address manager assigns unique addresses to its ports, and if it has any extra addresses available, relinqueshes control over those extra addresses to another component that becomes the manager of those addresses. In this manner, control over the available addresses is distributed among the components in the system, which assign a unique address to every port.

BRIEF DESCRIPTION OF THE DRAWINGS

FIGS. 3(a)–(b) respectively show the manner in which the Max. and Min. resource allocation time out values (R_A_TOV) for a fabric element issuing a DSP request are compared with the fabric-wide service parameters of the responding fabric element;

FIGS. 4(a)–(b) respectively show the manner in which the Max. and Min. error detect time out values (E_D_TOV) for a fabric element issuing a DSP request are compared with the fabric-wide service parameters of the responding fabric element;

FIG. 5 shows the manner in which the maximum round-trip time value (MRTT) for a fabric element issuing a DSP request is compared with the fabric-wide service parameters of the responding fabric element;

FIGS. 6(a)–(b) respectively show the manner in which the Max. and Min. data field sizes are compared for the requesting and responding fabric elements during a DSP request;

FIGS. 8(a)–(b) show the manner in which the priority levels are updated and determined for region-wide service parameters;

FIG. 9 shows an illustrative example of various region-wide service parameters and whether or not they are provided in each of service classes 1–4;

FIGS. 10(a)–(c) show an illustrative example of a data frame organization for a DSP request to establish fabric-wide and region-wide service parameters;

FIG. 12 is an illustrative 24-bit address partitioning for one embodiment of the invention;

FIG. 15 is a table showing the manner in which a fabric element receiving a validate name data frame responds thereto.

DETAILED DESCRIPTION OF ILLUSTRATIVE EMBODIMENTS

Fibre Channel supports five different service classes that can be employed to communicate between devices and/or switches in a system, i.e., service classes 1–4 and F. These service classes are defined in detail in the FC-PH document that establishes the Fibre Channel standard. Briefly, service class 1 establishes a dedicated connection between two devices, and the connection is retained and guaranteed by the fabric. Service class 2 is a connectionless service with the fabric multiplexing frames at frame boundaries. The device provides acknowledgment of delivery or the fabric provides notification of failure to deliver transmitted frames. Service class 3 is also a connectionless service with the fabric multiplexing frames at frame boundaries, but supports only unacknowledged delivery. Service class 4 establishes a pair of unidirectional virtual connections between two devices, and the virtual connections are retained and guaranteed by the fabric. In class 4, the fabric guarantees a fraction of the available bandwidth between the devices involved in each virtual connection. Service class F is a connectionless service that is restricted to use only by fabric elements (i.e., switches) when communicating with each other.

Fibre channel also supports the following four data rates: (1) 132.8125 MBaud; (2) 265.625 MBaud; (3) 531.25 MBaud; and (4) 1.0625 GBaud.

Figure 1:
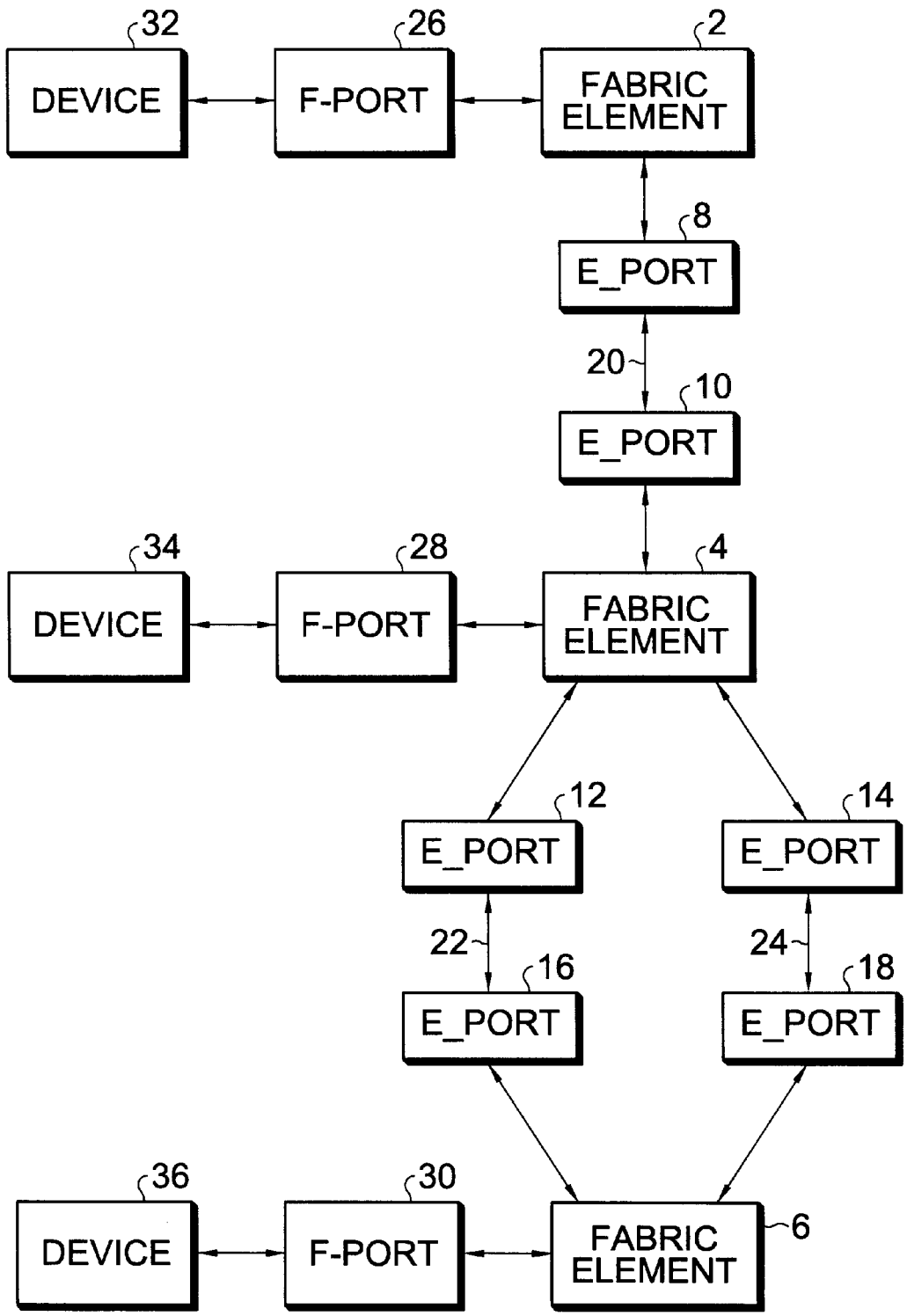
FIG. 1 is a block diagram of an example of a Fibre Channel system.

FIG. 1 shows an example of a Fibre Channel system that includes three fabric elements 2, 4 and 6. Each fabric element includes a switch (not shown) having a series of internally connected ports, such that data into one port of the switch can be output from any of the other ports. Each of the fabric elements 2, 4 and 6 is shown with at least one associated E_Port and F_Port. In particular, fabric element 2 has an associated E_Port 8, fabric element 4 has associated E_Ports 10, 12 and 14, and fabric element 6 has associated E_Ports 16 and 18. An E_Port is a label used to identify a port of a fabric element that is used to form a connection with another fabric element. The connection between two E_Ports is established via an Inter-Element Link (IEL). In FIG. 1, E_Ports 8 and 10 are connected via IEL 20, E_Ports 12 and 16 are connected via IEL 22, and E_Ports 14 and 18 are connected via IEL 24. Each IEL supports only one of the Fibre Channel data rates.

In the example illustrated in FIG. 1, fabric elements 2, 4 and 6 respectively have associated F_Ports 26, 28 and 30. An F_Port is a label used to identify a port of a fabric element that is used to form a connection with a device, such as a computer or peripheral. In FIG. 1, F_Ports 26, 28 and 30 are respectively coupled to devices 32, 34 and 36. In the system shown in FIG. 1, a physical path exists, via fabric elements 2, 4 and 6, between each of the devices 32, 34 and 36. However, as described above, Fibre Channel allows devices to be connected to a single system even if they do not support compatible protocols. Therefore, although devices 32, 34 and 36 are connected to the same physical system, communication between each is not necessarily possible or desirable. Based on the service parameters supported by each of the fabric elements (2, 4 and 6) and their associated devices (32, 34 and 36), there are a number of possible configurations for the system of FIG. 1. For example, the system may include a single fabric, wherein all of the devices can communicate using each of the service classes supported by Fibre Channel; as discussed above, a fabric is a network of switches for interconnecting a plurality of devices without restriction as to the manner in which the switches can be arranged, and can include a mixture of other topology types. Alternatively, the system may include a single fabric wherein one of the devices can communicate with the others in only a subset of the supported service classes. Finally, the system may include one or more fabrics wherein communication between some of the devices is not enabled in any of service classes 1–4.

The present invention provides a method for distributing service parameters among the fabric elements to determine and define the configuration of the system. The system configuration is initially determined during initialization. However, in a large networked system, devices may frequently be added or removed. Whenever the system is altered, the alteration could impact the service parameters employed by the other switches and devices in communicating over the system. Therefore, whenever the system is altered, it is desirable to recheck the configuration of the system and the service parameters employed by its devices to determine whether any modifications should be made. It is also desirable to do so without requiring that the entire system be brought off-line. This result is achieved in one embodiment of the present invention. Furthermore, the present invention allows configuration of the system, and reconfiguration when necessary, without requiring synchronization between the fabric elements, irrespective of the number and arrangement of elements in the system.

In one illustrative embodiment of the present invention, the configuration of a Fibre Channel system during system initialization is determined by executing a distribution of service parameters (DSP) procedure, wherein DSP requests are issued from all fabric elements in the system. Each fabric element issues a separate DSP request for each of its associated E_Ports. Each DSP request includes information defining the service parameters that the requesting fabric element wishes to support. This information is transmitted over the IEL that connects the E_Port of the requesting fabric element to a responding fabric element. The responding fabric element compares the service parameters of the requester with its own, to determine whether they are compatible, and sends an acknowledgment data frame to the requester specifying the service parameters of the responder. If necessary, the responding fabric element revises its own service parameters to be compatible with those of the requester, and issues a DSP request of its own with the updated service parameters. The updated service parameters are received by the fabric element that issued the original DSP request, and may prompt that fabric element to also modify its service parameters to achieve compatibility; this iterative process is discussed in more detail below. The responding fabric element also issues a DSP request with its updated service parameters to every other fabric element to which it is directly connected via an IEL.

Within a single fabric, devices and fabric elements may be grouped into smaller subfabrics, which may in turn be subdivided into regions. Devices and fabric elements within a subfabric and region share some common characteristics that may not be shared by every device and element in a single fabric. The present invention determines the configuration of the system in terms of the number and arrangement of fabrics, subfabrics and regions, through the use of the DSP procedure. The particular service parameters used to define a fabric, any subfabrics within a fabric, and any regions within a subfabric are discussed in more detail below. For the purpose of explaining the DSP procedure and the way it is used to determine the configuration of the system, the following explanation is provided referring only to a single fabric-wide service parameter, i.e., the fabric name. The other service parameters are determined in a similar fashion as discussed below.

The fabric name is a unique number used to uniquely identify the fabric. Conventionally, devices in a network are provided with unique names or identification (ID) numbers to uniquely identify each device for various network management functions. For this purpose, the Institute of Electrical and Electronic Engineers (IEEE) provides a service wherein a user can purchase a block of numbers that can then be assigned to the purchaser's devices and switches that are to be connected to a network. Separate numbers are assigned to each port of each device and switch. When this service is employed by all users of a network, it is ensured that no two ports on the network will have the same ID number. Similarly, it is desirable for network management purposes to identify all of the fabric elements in the system that belong to the same fabric, and to adopt a unique name for each fabric.

In accordance with the present invention, each fabric is named by adopting the ID number of one of the fabric elements within the fabric as the name for the entire fabric. In the particular embodiment of the invention described below, the fabric adopts as its name the lowest ID number of any of its associated fabric elements. However, it should be understood that other techniques can alternatively be employed, such as selecting the highest ID number.

During initialization, each fabric element initiates a separate DSP request from each of its E_Ports, across its associated IEL, to an adjacent fabric element. In the illustrative system shown in FIG. 1, the following six DSP requests would be initiated: (1) a DSP request initiated by fabric element 2 and destined for fabric element 4 across IEL 20; (2) a DSP request initiated by fabric element 4 and destined for fabric element 2 across IEL 20; (3) a DSP request initiated by fabric element 4 and destined for fabric element 6 across IEL 22; (4) a DSP request initiated by fabric element 4 and destined for fabric element 6 across IEL 24; (5) a DSP request initiated by fabric element 6 and destined for fabric element 4 across IEL 22; and (6) a DSP request initiated by fabric element 6 and destined for fabric element 4 across IEL 24. Each DSP request includes, (inter alia), data identifying the current ID number of the initiating fabric element. When a fabric element receives a DSP request, it compares the ID number of the requester with its own. If the ID number of the requester is greater than the ID number of the responder, the responding fabric element does not update its ID number, and responds by transmitting an acknowledgment data frame to the requester with the responder's ID number. If the responding fabric element has an ID number that is greater than that of the requester, the responding fabric element updates its ID number to adopt that of the requester, prior to sending the acknowledgment data frame. The responding fabric element then transmits its own DSP request to the requester, indicating the adopted ID number and its other service parameters.

In addition to initiating a DSP request at initialization, each fabric element also initiates additional DSP requests whenever its service parameters are modified. For example, if a fabric element updates its fabric name as a result of a DSP request initiated by another to adopt the name of the requester, the fabric element will initiate an additional DSP request to each of its adjacent fabric elements, and the new request will include the newly adopted fabric name. Thus, the fabric name and other service parameters of the fabric elements will be continually and automatically updated until a stable condition is reached. A stable condition is reached when the last DSP request initiated by any fabric element does not result in a change in the service parameters of any of its adjacent fabric elements. For the above-described example in which the fabric name is determined, the stable state is reached when each of the fabric elements in a single fabric has adopted the same fabric name. After initialization, the DSP procedure operates in the background so that the system continues to operate while the DSP procedure is running. It is not until the DSP procedure is completed and a stable condition has been reached that the affected fabric elements and devices are taken off-line. The affected devices are taken off-line so that they can be re-initialized to establish new service parameters. For example, if a device is connected to a port of a fabric element that determines that the data frame size to be used by the region to which the device belongs should be updated as a result of the DSP procedure, the device is taken off-line and re-initialized so that it will employ the updated data frame size in communicating with other devices over the system.

If a device connected to a fabric element port becomes inactive or is removed from the system, the system manager has the option of altering the service parameters of the fabric element port. If a device is being moved temporarily, the system manager may choose to leave the service parameters of its associated fabric element port unchanged, so that it will not be necessary to invoke the DSP procedure, which could potentially alter the system's service parameters and require taking at least some of the system devices off-line for reinitialization. However, if for any reason the system manager determines that it is desirable to update the service parameters of the fabric element port associated with the device, he may do so, triggering operation of the DSP procedure.

In one embodiment of the invention, the stable condition for the DSP procedure is recognized independently by each fabric element in the system. After sending a DSP request, each fabric element sets a timer indicating a time period during which the fabric element would expect to receive a DSP request from another if the service parameters that the fabric element had adopted and sent out in its last DSP request caused any other fabric element in the system to modify its fabric-wide service parameters. When the timer expires without another DSP request having been received, the fabric element assumes that the stable condition has been reached. It is desirable to have this time period be sufficiently long so that users are not interrupted by taking their devices off-line to update the service parameters until those parameters have become stable. However, it is not particularly harmful if one or more fabric elements resume processing prematurely before the service parameters have actually stabilized, because the devices connected to the fabric elements will simply operate based on the existing service parameters. When a subsequent DSP request received by the fabric element results in a change of its service parameters, the fabric element and its associated devices will simply be taken off-line again and reinitialized with the new service parameters.

Figure 2A:
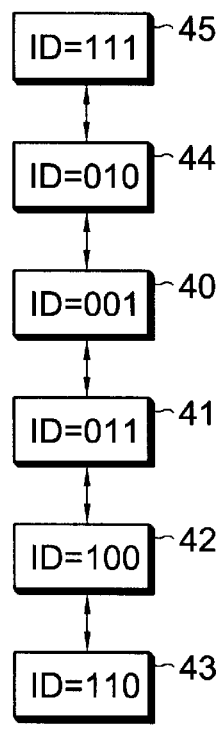
FIGS. 2(a)–(d) show the manner in which the distributed service parameter (DSP) procedure results in an updating of the fabric name for each fabric element in a system.
Figure 2B:
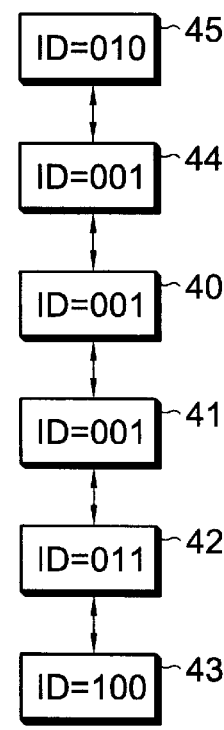

FIGS. 2(a)–(d) illustrate, using the fabric name example, how the service parameters are iteratively updated as a result of the above-described DSP procedure. FIGS. 2(a)–(d) illustrate a Fibre Channel system that includes six fabric elements 40–45. In FIG. 2(a), the unique ID name for each fabric element is shown, with the lowest ID name belonging to fabric element 40. FIG. 2(b) shows the updated state of the fabric element names that results from one pair of DSP requests being transmitted between each pair of adjacent fabric elements. The fabric name of the element within each adjacent pair that initially had the higher ID name is updated as a result of the initial DSP requests to adopt the lower ID name of its neighbor.

Figure 2C:
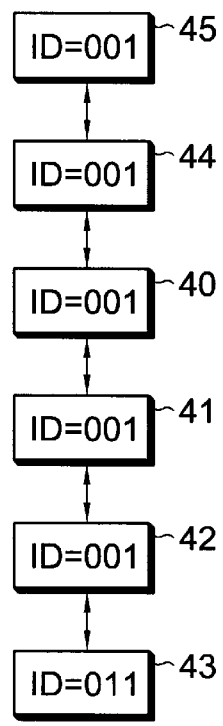
Figure 2D:
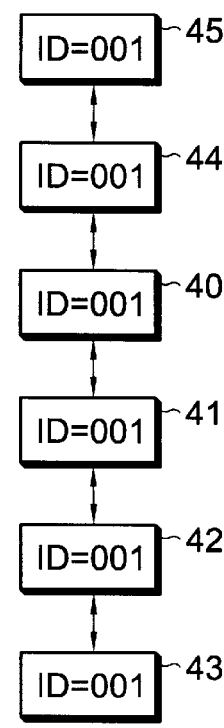

Each fabric element that has its ID name updated in FIG. 2(b) initiates an additional DSP request with its adjacent fabric elements, resulting in further updating of the fabric names associated with some of the fabric elements as shown in FIG. 2(c). One of the fabric elements whose fabric name is updated in FIG. 2(c) is fabric element 42. As a result, fabric element 42 initiates another DSP request with its adjacent fabric elements 41 and 43. The DSP request with fabric element 41 does not result in any change to the fabric name of either element 41 or 42. However, the DSP request with fabric element 43 results in an updating of the fabric name of that fabric element to adopt the lower ID name (001) of fabric element 42 as shown in FIG. 2(d).

As seen from FIGS. 2(a)–(d), the DSP procedure of the present invention allows for the adoption of a common service parameter, a fabric name in the illustrated example, among each of the fabric elements in the system. FIGS. 2(a)–(d) are presented merely to illustrate the manner in which the DSP procedure results in an automatic updating of each of the fabric elements in the system. However, it should be understood that the DSP procedure is not required to operate in a synchronous manner and to proceed in any particular order. The DSP procedure operates without requiring synchronization between any of the fabric elements. The order and timing of the DSP requests initiated by the various fabric elements is immaterial. The DSP procedure will result in a consistent adoption of service parameters for each of the fabric elements in the system regardless of the order and timing in which the DSP requests are initiated, In one embodiment of the present invention, each fabric element is also provided with a fabric name priority, in addition to its ID name. When the fabric name priority feature is used, the name adopted for the fabric will correspond to the ID name of the fabric element within the fabric that has the highest name priority. Amongst devices having the same priority level, the determination of the fabric name is made based upon a further refinement scheme, such as using the highest or lowest ID name in the manner described above.

The fabric name priority feature enables some management control over which fabric element will be selected to provide the fabric name. In network installations, some elements may be key components, while others are less important for various reasons, such as infrequency of use or lack of reliability. The fabric name priority enables the system manager to influence which element will have its ID name adopted as the fabric name, so that a reliable or otherwise desirable element will be selected. As discussed above, whenever a system service parameter is changed, any device or switch in the system that is impacted by the change is taken off-line, and then reinitialized to update its service parameters. The fabric name is a service parameter that impacts every element in the fabric, because each stores the fabric name of the fabric to which it belongs. Thus, whenever the fabric name is changed, every device and switch in the fabric is taken off-line and reinitialized. If the fabric element from which the fabric took its name is removed from the system, the name of the fabric should be changed, because the removed element could be added to another system and could result in a different fabric taking its name. Since it is desirable to have the fabric name uniquely identify the fabric, this is obviously undesirable. Thus, it is desirable to take the fabric name from a reliable and key element of the system, to reduce the likelihood that the element will fail or be removed from the system, thereby decreasing the likelihood of a change in the name of the fabric which would result in all of the devices and switches in the fabric be taken off-line and reinitialized. If a less important component fails or is otherwise removed from the system, it may have no impact on the service parameters of any other device or switch. Thus, the neighboring fabric elements would not need to send out DSP requests to any other fabric elements, because the system's service parameters would not be impacted.

In one embodiment of the invention, whenever a fabric element receives a DSP request, it returns an Inter Element Accept (IE_ACC) data frame which includes data indicating the service parameters of the responding fabric element. If the service parameters of the responder are modified as a result of the DSP request, the modifications are made before sending the IE_ACC data frame. The IE_ACC data frame is sent as an acknowledgment signal, consistent with the Fibre Channel standard, to provide an indication that the DSP request was received. However, it should be understood that the sending of the IE_ACC data frame is not necessary for the operation of the DSP procedure. DSP requests are issued by both fabric element ports connected together via an IEL. Thus, each fabric element is provided with the service parameters of its adjacent fabric element through the DSP requests, and need not be provided with this information via an IE_ACC data frame.

The fabric-wide service parameters are established to be the same for every fabric element belonging to a single fabric. The fabric-wide service parameters are simultaneously determined using the DSP procedure described above in connection with the illustrative example of how the fabric name is determined. In addition to the fabric name, one illustrative embodiment of the present invention employs the following four additional fabric-wide service parameters: (1) minimum and maximum Error Detect Time Out Values (min. and max. E_D_TOV); (2) Maximum Round-Trip Time Value (MRTT); (3) minimum and maximum Resource Allocation Time Out Values (min. and max. R_A_TOV); and (4) minimum and maximum Buffer-to-Buffer Receive Data Field Size values. The timer values and limits on the data field size are defined by the Fibre Channel standard set out in the FC-PH document. The timers may have many uses. A brief description of the timer values and illustrative uses are provided below. It should be understood that these descriptions are not complete and are provided merely for illustrative purposes.

E_D_TOV can be used to define the time period in which a device which sends a data frame in response to a request expects to receive an acknowledge signal indicating that the data frame was received.

R_A_TOV is defined in FC-PH as being equal to E_D_TOV+MRTT, and defines the longest time that a frame, once it has entered a fabric, can stay in the fabric. Although the timer has many other uses, it may be used when a data frame is sourced through the fabric. The source device can set a timer equal to R_A_TOV and expects to receive an acknowledge signal before the timer lapses. If no response is received, the source device assumes that the data frame or the acknowledgment was lost.

In one embodiment of the invention, R_A_TOV is also used to establish the time limit set by each fabric element after sending a DSP request to determine when the fabric-wide service parameters have stabilized. In this embodiment, the timer is set equal to twice the fabric element's Min. R_A_TOV. This timer value was selected because it defines a relatively long time period, and should allow sufficient time for the DSP procedure to ripple through each fabric element in the system whenever the service parameters are being updated. It should be understood that although twice the Min. R_A_TOV value is selected in one embodiment, numerous other timer values could be selected that would achieve satisfactory results.

MRTT establishes the maximum propagation delay for a frame through the switches and links of the fabric and back. MRTT is related to R_A_TOV and E_D_TOV, and will generally be shorter than each. For example, the difference between E_D_TOV and MRTT may establish the amount of time that a device is allowed to determine whether it should send an acknowledge signal when it receives a data frame. Defining MRTT separately enables a fabric element to determine whether its associated devices can respond quickly enough to satisfy R_A_TOV and E_D_TOV, in view of the established MRTT for the fabric.

The maximum and minimum buffer-to-buffer data field sizes determine the size of the data frames transmitted through the fabric. Fibre Channel supports data frames ranging from 128 bytes to 2,112 bytes. Some devices in the system may not have hardware that supports a frame of 2,112 bytes, or even a smaller frame. Therefore, each fabric element may limit the maximum buffer-to-buffer size that its associated devices can support. Additionally, lower performance devices that can support larger frame sizes may choose to set their minimum buffer size to a relatively large value. This will prevent those devices from being grouped in a fabric with devices having comparatively small frame sizes, which could negatively impact the performance of the lower performance devices because they may not be able to generate a large number of small frames quickly enough to achieve satisfactory performance.

Although the illustrative embodiment discussed above provides both minimum and maximum values for some of the timers and the buffer size, it should be understood that a single value can alternatively be provided for each. Minimum and maximum values are provided in one embodiment of the present invention to enable a system manager to have some flexibility and control over the capabilities of other devices with which his switches and devices can be joined in a single fabric. It is not necessarily desirable to join together in a single fabric every pair of devices that can communicate at some level. For example, if one fabric element is connected to a high-speed device, the performance of the device could be seriously degraded if the values of certain timers were set too high. Therefore, although a device may be able to support a high timer value, the system manager may choose to set the maximum value of the timer for the fabric element associated with his device to a lower value. As a result, a deliberate decision can be made to prevent the device from being combined in a single fabric with any device that could seriously impact its performance. The use of maximum and minimum values for the timers and the data field size allows a system manager to provide a range of performance requirements for other devices with which the device to which the fabric element is coupled can be grouped in a single fabric.

FIGS. 3(a) and (b) illustrate the manner in which the above-described service parameters are compared when a DSP request is initiated between two fabric elements. In each of these figures, the service parameters of the fabric element that responds to the DSP request ("the Responder") are labeled B, and the service parameters for the fabric element that initiated the DSP request ("the Requester") are labeled A. More specifically, the following labels apply in FIGS. 3(a)–(b) for the Requester: A1=Max. R_A_TOV and A2=Min. R_A_TOV. The following labels apply for the Responder: B1=Max. R_A_TOV; B2=Min. R_A_TOV; B3=Max. E_D_TOV; B4=Min. E_D_TOV; and B5=MRTT. The Condition column for the tables in FIGS. 3(a) and (b) shows the possible results of comparisons between the designated service parameter of the Requester, and each of the five above-referenced service parameters of the Responder. For each comparison, the three possible results (i.e., Requester is greater, Requester is less than, or the two are equal) are shown in the Condition column. The results of each comparison are shown in the Result column.

When the service parameter for the Requester is compared with the identical service parameter for the Responder, the result may involve an updating of the Responder's service parameter. For example, the first condition tested in FIG. 3(a) illustrates that when Max. R_A_TOV for the Responder (B1) is greater than for the Requester (A1), the Responder's Max. R_A_TOV is modified to adopt the Requester's value for that service parameter. This is designated in the Result column as follows: B1←A1.

When the service parameter for the Requester is compared with a different service parameter for the Responder, the result will not lead to an updating of either fabric element's service parameter. However, these tests may indicate that the compared service parameters are incompatible, represented as a "Reject" in the Result column. Such a result indicates that the Requester and Responder will not be joined in a single fabric.

The other possible results of a comparison of two different service parameters are: (1) an indication that the compared service parameters are compatible (represented as an "Accept" in the Result column); and (2) and indication that the comparison is inconclusive (represented with a "?" in the Result column). An inconclusive result indicates that the comparison provides no useful information with regard to whether the compared service parameters are compatible. Similarly, an Accept result indicating compatibility of the compared parameters, in and of itself, does not indicate compatibility of the Responder and Requester fabric elements, because if any other pair of service parameters is incompatible, the fabric elements will not be combined in a single fabric.

The comparison of some pairs of service parameters will not result in an updating of the Responder's service parameters, and cannot alone lead to a conclusion that the compared service parameters are incompatible because it will always yield an inconclusive or Accept result. For example, the comparison shown in FIG. 3(b) between Min. R_A_TOV (A2) of the Requester and Max. E_D_TOV (B3) of the Responder will necessarily lead to either an inconclusive result, or to an Accept condition indicating that these two parameters are compatible. Since an Accept result is not determinative, the testing of these two parameters provides no definitive information as to whether the two fabric elements are compatible. Therefore, these service parameters need not be compared. In one embodiment of the present invention, comparisons which cannot lead to either an updating of a service parameter or a potential Reject result are not done to conserve processing resources.

FIGS. 4(a)–(b) respectively show the manner in which the service parameters of the Responder described in connection with FIGS. 3(a)–3(b) are compared with the Requester's Max. E_D_TOV (A3) and Min. E_D_TOV (A4). FIG. 5 shows the manner in which those same Responder service parameters are compared with the Requester's MRTT. FIGS. 6(a)–(b) respectively show the comparison of the Requester's Max. data field size (A1) and Min. data field size (A2) with the Responder's Max. (B1) and Min. (B2) data field sizes. The same format is used in FIGS. 4–6 as was described above in connection with FIGS. 3(a)–(b).

The results shown in the tables of FIGS. 3(a)–(b), FIGS. 4(a)–(b), FIG. 5 and FIGS. 6(a)–(b) are self-explanatory. Generally, when a maximum value for the responding device exceeds that of the requesting device, the service parameter of the responding device is updated to adopt the maximum limit of the Requester. Similarly, if the minimum value of the Responder is less than that of the Requester, the parameter of the Responder is updated to adopt the value of the Requester. In this manner, service parameters are adopted which are compatible for both the Requester and Responder. With respect to MRTT, this value is generally compared with twice the R_A_TOV or E_D_TOV values because MRTT represents a round-trip time through the fabric, whereas the time out values represent paths in only a single direction.

The MRTT value and the Max. and Min. timer values for R_A_TOV and E_D_TOV for each fabric element can initially be set to any of various values while achieving satisfactory system performance. The Fibre Channel standard in FC-PH specifies a 32-bit clock value with 1 ms units. Thus, 1 ms is the smallest increment used for each of the timer values. Max. R_A TOV has only one limitation, i.e., it should be equal to or greater than Min. R_A_TOV. In one embodiment of the invention, a default value for Max. R_A_TOV is set to 120 seconds, and a default value for Min. R_A TOV is set to 15 seconds. In order to ensure that Min. R_A TOV is sufficiently long, one embodiment of the invention requires that it be greater than the value of 1.2 times (Max. E_D_TOV+MRTT). This requirement is taken directly from the Fibre Channel standard in FC-PH, which specifies that Min. R A_TOV should maintain this relationship, and that a 20% tolerance is required for all timers in a Fibre Channel system.

In one embodiment of the invention, Max. E_D_TOV is set to a default value of 10 seconds, and Min. E_D_TOV is set to a default value of 2 seconds. Max. E_D_TOV must only satisfy the limitation that it be equal to or greater than Min. E_D TOV. Min. E_D_TOV should be set equal to a value that accounts for MRTT, as well as the time necessary for a responding device to reach a determination as to how it will respond to a request. In one embodiment of the invention, Min. E_D_TOV satisfies the relationship of being greater than or equal to twice MRTT because this is believed to be a satisfactory value for most devices. However, this requirement can be altered if it is found not to provide satisfactory system performance.

FC-PH establishes the maximum time for delivery of a frame through a Fibre Channel fabric as equaling ½ of MRTT. Based on the prior relationships discussed above, Min. E_D_TOV must be greater than or equal to 2MRTT, and Min. R_A TOV must be greater than E_D_TOV+MRTT. Therefore, Min. R_A TOV must be greater than 3MRTT. The largest value that Min. R_A_TOV can take using the Fibre Channel clock is $2^{32}-1$. Therefore, MRTT must be less than $(2^{32} -1) \div 3$.

As discussed above, the Max. and Min. buffer-to-buffer receive data field sizes have some limits placed upon them by the Fibre Channel standard. Thus, each must be less than or equal to 2112 bytes, and greater than or equal to 128 bytes. Furthermore, Fibre Channel requires that information be transmitted in at least 32-bit words. Thus, mod 4 of each of the Min. and Max. data field sizes should be equal to 0. Finally, the Max. data field size should be greater than or equal to the Min. data field size.

Whenever a DSP process requester and responder are not compatible for any of the fabric-wide service parameters, a fabric split results between the fabric elements, resulting in the formation of at least two distinct fabrics in the Fibre Channel system. For example, in the illustrative embodiment of the invention having the fabric-wide service parameters discussed above, a single Reject condition from any of the service parameter comparisons shown in FIGS. 3–6 results in a fabric split between the requesting and responding fabric elements.

When a fabric split results between two fabric elements, no communication in any of service classes 1–4 takes place over the IEL connecting them. For example, if a DSP request initiated by fabric element 4 in FIG. 1 prompted a Reject condition with any of the service parameters of fabric element 2, a fabric split would result between these two fabric elements, ensuring that at least two distinct fabrics would be formed in the system with fabric elements 2 and 4 being in different fabrics. Thus, fabric elements 2 and 4 would not communicate in any of service classes 1–4 over IEL 20. However, as discussed above, the DSP procedure is not run only at initialization. Whenever a device or fabric element is added or deleted from the system which results in a change of service parameters for any fabric element, that fabric element issues DSP requests to each of its neighboring fabric elements. Therefore, despite the fabric split, communication between fabric elements 2 and 4 continues in class F so that subsequent DSP requests can be exchanged between the two fabric elements, which could lead to a service parameter modification resulting in fabric elements 2 and 4 being joined in a single fabric, thereby enabling communication in one or more of service classes 1–4.

Subfabrics

It should be recognized from the foregoing discussion of the illustrative fabric-wide service parameters that these parameters are very broad, and can encompass devices operating in different service classes, and at different data rates. Thus, the devices and fabric elements contained in a single fabric may be restricted in the service classes and data rates that they can use to communicate with one another, or may not be able to communicate with one another at all. To determine which devices and fabric elements in a fabric can communicate and under what conditions, each fabric is sub-divided into twenty pre-defined subfabrics. One subfabric corresponds to each combination of one of the five service classes (classes 1–4 and class F) and one of the four data rates supported by Fibre Channel. Thus, each subfabric defines one service class and a single data rate. Any device or fabric element that supports the service class and data rate defined by a particular subfabric is considered to be a part of that subfabric.

Regions

Although each fabric element and associated device included within a single subfabric will necessarily have compatible hardware for communicating with other elements and devices in the same subfabric, communication between each of the devices in a single subfabric is not guaranteed. Depending upon the configuration of the system, there may not be a path of data links which supports the subfabrics class and data rate through which two devices in the subfabric can communicate. Thus, each subfabric may be subdivided into a plurality of regions, wherein each region defines a group of devices and fabric elements within the subfabric that are interconnected by at least one path.

Subfabrics and regions are further explained using an illustrative system shown in FIGS. 7(*a*)–(*e*). FIG. 7(*a*) shows a single fabric 50 having seven fabric elements 51–57, each connected to at least one of devices 60–74. The fabric 50 includes data links at two Baud rates, i.e., a 1.0625 GBaud link 80 shown as a solid line interconnecting fabric elements 51–57 and further connecting some of the fabric elements to their associated devices, and a 265.625 MBaud link 82 shown in dotted line interconnecting fabric elements 53 and 55, and connecting each of fabric elements 53, 55 and 57 to an associated device. The fabric also supports three service classes, i.e., service classes 1–2 and service class F. This combination of service classes and data rates results in the fabric 50 supporting four subfabrics that are respectively shown in FIGS. 7(*b*)–(*e*).

As discussed above, each IEL that establishes a link between two fabric elements supports only a single data rate. Thus, for fabric elements that communicate using more than one data rate, such as fabric elements 53 and 55 shown in FIG. 7(*a*), separate IELs are formed for each supported data rate.

FIG. 7(*b*) shows a first subfabric defined by service class 1 and a data rate of 1.0625 GBaud. This subfabric includes fabric elements 51, 52, 54 and 56 and each of their associated devices, as well as fabric element 57 with one of its associated devices 69. The subfabric of FIG. 7(*b*) is split into two unconnected regions R1 and R2. Thus, although fabric elements 51 and 56 and their associated devices operate at a compatible service class and data rate, they cannot communicate because there is no path of data links that connects them and supports service class 1 and the 1.0625 GBaud data rate.

FIG. 7(*c*) shows a second subfabric defined by service class 2 and a 1.0625 GBaud data rate. This subfabric includes a single region R3 that includes all of the fabric elements and associated devices in the subfabric. Among other fabric elements and devices, the subfabric of FIG. 7(*c*) includes fabric elements 52 and 57, as well as their respectively associated devices 62 and 69, each of which was also included in the subfabric of FIG. 7(*b*). These fabric elements and devices are included in more than one subfabric because each supports multiple service classes and/or multiple data rates.

FIG. 7(*d*) shows a third subfabric defined by service class 2 and a data rate of 265.625 MBaud. This subfabric is split into two Regions R4 and R5. The subfabric of FIG. 7(*d*) includes both fabric elements 55 and 57, each of which is also included in the subfabric of FIG. 7(*c*). Those fabric elements are in the same region in the subfabric of FIG. 7(*c*) because a communication path exists between them at 1.0625 GBaud. However, no communication path exists between fabric elements 55 and 57 at 265.625 MBaud, causing these fabric elements to be in separate regions in the subfabric of FIG. 7(*d*). Thus, although these fabric elements are located in two common subfabrics, they and their associated devices can only communicate in one of the subfabrics.

Finally, FIG. 7(*e*) shows a subfabric at class F and a data rate of 1.0625 GBaud. This subfabric includes fabric elements 51–57, which each supports this subfabric to allow the fabric elements to implement the DSP procedure discussed above.

In one embodiment of the invention, service class and/or data rate translators are provided to enable communication between two distinct regions. A translator is associated with at least one fabric element, and translates communications between two different service classes and/or data rates so that they are compatible, thereby enabling communication between devices and fabric elements that would otherwise be unable to communicate.

When a translator is employed between two regions, the result is an extended region that includes those two regions. An example of an extended region is shown in FIG. 7(*f*), in which a data rate translator (not shown) is provided in either of fabric elements 55 and 57 to join region R3 of FIG. 7(*c*) and region R4 of FIG. 7(*d*) to form an extended region ER1. The translation is transparent to devices 62–64 and 67–69 in extended region ER1, and communication is enabled between any of the devices in the same manner that devices within any region of a subfabric communicate.

As should be appreciated from the foregoing, the establishment of fabric-wide service parameters is not sufficient to determine which fabric elements and associated devices in the system can communicate with one another. The determination of which fabric elements and devices can communicate, as well as the service classes and data rates available for such communication are established at the region level. Thus, the present invention establishes not only fabric-wide service parameters for the system, but also region-wide service parameters.

The region-wide service parameters are determined using the same DSP procedure described above in connection with the fabric-wide service parameters. Although fabrics, subfabrics and regions have been described in a hierarchical fashion, the establishment of the region-wide service parameters is done simultaneously with the fabric-wide service parameters, using the same series of DSP requests discussed above.

In one embodiment of the invention, the region-wide service parameters each has an associated priority level which can be set by the system manager. The priority level can be determined by any number of bits. In one illustrative embodiment, a two-bit priority level is employed as shown in FIG. 8(a). This priority level enables each fabric element to identify whether or not it supports each of the region-wide service parameters. However, even though a fabric element has the capability of supporting a service parameter, the fabric element is not necessarily restricted to being grouped only in regions wherein the parameter is supported. The priority level allows the system manager to identify the following three priority levels of support: (1) supported only if all other fabric elements support the parameter; (2) supported if it requires a region split, but not a fabric split; and (3) supported even if it requires a fabric split. In this manner, the system manager has flexibility in determining the relative importance of each service parameter to the performance of each of his devices.

When the DSP procedure is executed in the manner described above, the priority level for each parameter of the Requester and Responder is updated in the manner shown in FIG. 8(b). As seen from FIG. 8(b), if either the Responder or Requester cannot support a service parameter, the priority level is set to indicate that the parameter would be unsupported if the two fabric elements were grouped together in a single region or fabric. Otherwise, the priority level is updated to match the higher priority of the Requester and Responder.

The region-wide service parameters are established to be consistent for each device and fabric element in a region. In order identify the devices within each region, one of the region-wide service parameters is a region ID. The region ID is similar in many respects to the fabric name that was discussed above in connection with the fabric-wide service parameters. The region ID is established, much like the fabric name, by the DSP procedure through the sending of DSP requests from each fabric element in the system. However, while the fabric name is the same for every port of a fabric element, the region names assigned to the E_Ports of any fabric element may differ.

As discussed above, each E_Port of a fabric element supports only a single data rate. Different E_Ports for a single fabric element may support different data rates, resulting in those E_Ports being grouped in different regions, even if they support a common service class. Furthermore, two E_Ports of a single fabric element may support different service classes, resulting in their being assigned to different subfabrics, and thus, to different regions. If two ports in a single fabric element support the same service class and data rate, those ports should be combined in the same region for that service class. Since the fabric element stores information regarding the service classes and data rates supported by each of its ports, the fabric element ensures that during the DSP procedure, ports within a single fabric element that support a common service class and data rate are grouped in the same region for that service class. This can be accomplished by maintaining a list in each fabric element of its ports that belong to a common region, or by other means.

Because two ports of a single fabric element can belong to different regions, the region ID, as well as each of the other region-wide service parameters, can potentially differ for each E_Port of a fabric element. Furthermore, since a single port of a fabric element can support each of service classes 1–4 and F, each port can potentially be included within five different subfabric regions, each having its own set of region-wide service parameters. Thus, although each fabric element has only a single set of fabric-wide service parameters common to all of its ports, the DSP procedure may need to determine as many as four sets of region-wide service parameters (one for each of service classes 1–4) for each E_Port; no set of region-wide parameters need be determined by the DSP procedure for class F because every fabric element supports a fixed set of service parameters for communicating in this service class.

In one illustrative embodiment of the invention, the fabric-wide and region-wide service parameters are transferred between fabric elements during the DSP procedure, and stored within each fabric element, in a data frame format shown in FIGS. 10(a)–(c). FIG. 10(a) shows a group of bits for establishing the fabric-wide service parameters for all ports in the fabric element, while FIG. 10(b) shows a group of bits for establishing region-wide service parameters for a single service class of one E Port. The bit format shown in FIG. 10(b) is replicated once for each of service classes 1–4 for every E Port. Following a command code that identifies a DSP request from any E_Port in the fabric element, the first 44 bytes of the request data frame specify the fabric-wide service parameters for the fabric element as shown in FIG. 10(a), and are followed by four 20-byte sets of region-wide service parameters for the requesting E_Port, in the format shown in FIG. 10(b). Although each fabric element port can theoretically be included in any of the twenty possible subfabrics discussed above, the fact that each E Port and its associated IEL supports only a single data rate limits the number of subfabrics to which each port can belong to the five subfabrics that include the supported data rate. Furthermore, since the service parameters for class F are predetermined for every fabric element port, these parameters are not stored and transferred as part of the DSP procedure. Thus, the use of four fields of region-wide service parameters, one for each of service classes 1–4, in combination with the known data rate for the requesting and responding E_Ports is sufficient to distinctly define the four possible regions to which each E_Port can belong.

The above-described data frame organization for storing and transferring the fabric-wide and region-wide service parameters during the DSP procedure is provided merely for illustrative purposes. A number of other formats can alternately be employed. Furthermore, other techniques can also be employed for designating the fabric-wide service parameters common to every E_Port, and the particular region-wide service parameters that can vary for each.

As discussed above, one of the region-wide service parameters is a region ID which is used to uniquely identify each region.. The region ID is a concatenation of three fields shown in FIG. 10(b), i.e., the 64-bit region name field, the 8-bit subfabric ID (SF_ID) field and the 8-bit region name priority field. The region name is determined by the DSP procedure in much the same manner as the above-described technique for determining the fabric name. In particular, each fabric element port is assigned a unique ID name, which can be one of the IEEE values discussed above. When the DSP process begins, each fabric element determines a single region name for each of its ports that belong to the same region. This can be done, for example, by selecting the lowest ID name for the ports in the region. The region name for each E_Port is then compared, in each of service classes 1–4, with the region name of the E_Port to which it is connected across an IEL. These four comparisons are only relevant for those service classes which are supported by both E_Ports, i.e., the DSP Requester and Responder. If the service class is not supported by both, the DSP request does not result in the updating of the region name for either. However, when both the Requester and Responder support a particular service class, the comparison results in their adopting a common region name, for example, by adopting the lowest region name ID in the manner described above in connection with the fabric name. The DSP procedure continues until a stable condition is reached in the manner described above. It should be recognized that since a single E_Port can support multiple service classes, the port may belong to a different region for each service class. Thus, the region name for any particular E_Port may be different in the four data frame fields of FIG. 10(b) that correspond to the different service classes.

At the conclusion of the DSP procedure, each region is identified by a unique region name having been commonly adopted by the fabric element ports belonging to the region. For a system without service class or data rate translators, the region name can simply be adopted as the region ID, because along with its corresponding position in the DSP data frame which establishes the service class to which it relates, as well as the known data rate which the corresponding E_Port supports, the region name uniquely identifies the region.

For systems with service class or data rate translators that can result in the formation of extended regions, the region name is insufficient to uniquely identify each region, because the corresponding service class and data rate do not necessarily bound an extended region, which can extend across multiple service classes and/or data rates. Thus, one embodiment of the invention provides a technique for determining whether ports having the same region name in different service classes are actually in distinct regions, or part of a single extended region.

The use of the subfabric ID field shown in FIG. 10 is one technique for providing a common region ID within the DSP data fields corresponding to service classes 1–4 for ports that are part of an extended region. In one illustrative embodiment, the subfabric ID (SF_ID) is an 8-bit field having the bit assignments shown in FIG. 10(c). For each of the ports of a fabric element that is not coupled to a class translator, the subfabric ID identifies the data rate supported by the port, and has bit values that identify the corresponding service class for each of the four DSP data frame positions corresponding to service classes 1–4. However, for a port whose associated fabric element is connected to a class translator, the subfabric ID is not necessarily established in this straightforward manner because at least two of the port's service classes will be within the same region. Therefore, their subfabric IDs are established to be equal to one another. This can be done by adopting the lowest ID value for the region ID field of the involved service classes, which as discussed above, is a concatenation of the region name priority, the subfabric ID and the region name. As the DSP procedure proceeds, whenever one of the region IDs for a service class that is coupled to another via a service class translator is updated, the region ID for the other class is also updated. As a result, the DSP procedure results in a common region ID being adopted for each fabric element port that belongs to an extended region.

Any fabric element that includes a data rate translator recognizes that two of its ports which support different data rates are part of the same extended region, and assigns them a common region name in the same manner in which any two ports of the fabric element that are part of the same region are assigned a common region name. Thus, the subfabric ID is not necessary to uniquely identify ports that belong to an extended region formed solely by a data rate translator. The region name is sufficient because two ports that support different data rates can only be assigned the same region name when they belong to the same extended region. The data rate component of the SF_ID is not necessary to uniquely identify extended regions, but is provided because it may prove useful for other purposes.

As discussed above, for systems in which extended regions are supported, the region name is a concatenation of the region name priority, subfabric ID and region name. In one embodiment of the invention, each fabric is identified with a fabric ID that is formed in a similar manner, i.e., the fabric ID is a concatenation of the fabric name priority, subfabric ID and fabric name. In the embodiments previously described, the fabric name alone was used to uniquely identify each fabric, because even when extended regions are supported, the fabric name is sufficient to uniquely identify each fabric. However, for the sake of simplifying the hardware and software used to compare IDs of the Requester and Responder during the DSP procedure, one embodiment of the invention uses the fabric ID to uniquely identify each fabric when extended regions are supported. In this manner, the same hardware and software can be used to compare the fabric and region IDs during the DSP procedure.

In one illustrative embodiment of the invention, the other region-wide service parameters include buffer-to-buffer data field sizes for each region, an addressing mode, a region-wide routing method, and various class-specific parameters.

The buffer-to-buffer data field size can be identified with Min. and Max. values separately for each subclass supported by a fabric element. Other than its association with only a single subclass, these Min. and Max. data fields operate in the same manner as the data field sizes discussed above in connection with the fabric-wide service parameters.

Addressing mode defines one of the following four modes supported by Fibre Channel: (1) administrative; (2) automatic; (3) directed; and (4) unconstrained. These modes define the manner in which the address for each device port and fabric element port is determined. Addresses are used to define the destination for a transmitted data frame. Although each device includes a unique ID name, that name is not used for addressing purposes. For example, the above-described unique names assigned according to the IEEE service are 64-bit names, whereas most networks provide a smaller address field, e.g., 24 bits.

In administrative mode, a system administrator manually assigns an address for each port. In automatic mode, the system automatically determines the address for each port using a pre-defined protocol. In directed mode, the address for each port is initially assigned automatically, but a system administrator can modify the results. The unconstrained mode is currently not implemented and is reserved for future use.

Fibre Channel also supports various routing methods which define how data link paths are determined through the fabric when a data frame is transmitted between two devices in the system. The following three routing methods are supported: (1) self-routing; (2) supervised; and (3) unrestricted. In self-routing mode, the switches in the system automatically figure out a path for routing a frame between two devices. In supervised mode, the switches initially determine a routing path, but the path can be modified by a system administrator if desired. In unrestricted mode, a system administrator manually provides the system with the desired routing path.

As mentioned above, the region-wide service parameters include a number of class specific parameters that may vary for each class supported by a fabric element. A first of these parameters is a class validity field which indicates, for the specific class at issue, whether the associated port of the fabric element supports the class.

Two additional parameters relate to a sequential delivery feature which ensures that when a device sources two consecutive frames through the fabric, they will arrive in the same order at the destination. Two types of sequential delivery may be supported, i.e., global and selective. With global sequential delivery, sequential delivery is ensured by the fabric every time frames are transferred through the fabric. With selective sequential delivery, in-order delivery is only ensured when requested by a device. The illustrative region-wide service parameters include two bits that respectively indicate whether the global and selective sequential delivery features are supported by the port of the fabric element transmitting the DSP frame.

Two additional service parameters relate to a stacked connection feature, which is useful in implementing service class 1. In class 1, a dedicated connection path is maintained by the fabric between two devices, which are the only users of that path. The stacked connect feature allows a source to transmit multiple requests for such a connection, wait to see which device is first to respond, and then form a dedicated connection with that device. Two modes of stacked connection are supported, i.e., transparent and lock-down. The transparent stacked connect feature allows a device receiving a connection request to immediately respond and begin using the connection. The receiving device need not await any indication that the connection has been made, because it is made automatically. In this mode, the fabric ensures that no two devices can simultaneously receive requests for a connection from a single source. In lock-down mode, the fabric does not prevent connections from being made simultaneously with two devices. Therefore, a device that receives a request for a dedicated connection does not begin using the connection immediately. Rather, the device sends an indication to the requester that it is available for the requested connection, but must await notification that the connection has been made before it can begin using the connection.

The region-wide service parameters discussed above are useful in implementing service classes 1–4. The table shown in FIG. 9 demonstrates the applicability of these region-wide service parameters to each of service classes 1–4. An "n" (no) in FIG. 9 indicates that a particular service parameter is not applicable to the relevant service class, and a "y" (yes) indicates that the parameter is applicable to the class. The left-hand column of FIG. 9 indicates a bit number for each of the service parameters and relates to an illustrative arrangement of a data frame to be transmitted between requesting and responding fabric elements during the DSP procedure as described in more detail below.

It should be understood that the specific region-wide service parameters discussed above are provided merely for illustrative purposes, and that alternate parameters can also be provided. Region-wide service parameters are those which define service options that should be supported by every fabric element and device in a region, so that every device in a region can communicate using consistent parameters. During the DSP procedure, the question of whether a particular service option will be adopted for a region depends not only on whether it is supported by the fabric elements that could potentially be within the region, but also on the priority levels established by each of the fabric elements as discussed above in connection with FIG. 8.

FIGS. 10(a) and (b) show an illustrative data frame format that can be used to perform the DSP procedure discussed above in connection with establishing fabric-wide and region-wide service parameters. FIG. 10(a) shows a group of bits for establishing the fabric-wide service parameters. FIG. 10(b) shows a set of bits for establishing the region-wide service parameters for a single service class. As discussed above, the bit format shown in FIG. 10(b) is replicated once for each of service classes 1–4. Following a command code that identifies a DSP request, the first 44 bytes of the frame specify the fabric-wide service parameters as shown in FIG. 10(a), and are followed by four 20 byte sets of region-wide service parameters in the format shown in FIG. 10(b). In this illustrative embodiment, the region-wide service options shown in bits (31–16) of words zero and one in FIG. 10(b) have the bit assignments shown in FIG. 9. The priority level for each service parameter is established by the value of the corresponding bits in words zero (E) and one (e), in the manner shown in FIG. 8. It should be understood that this particular data format is provided merely for illustrative purposes, and that alternate formats can also be used.

Figure 11:
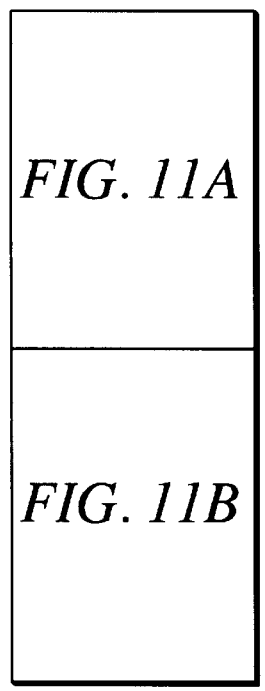
FIG. 11 is a flowchart of a method executed by each fabric element during the DSP procedure.
Figure 11A:
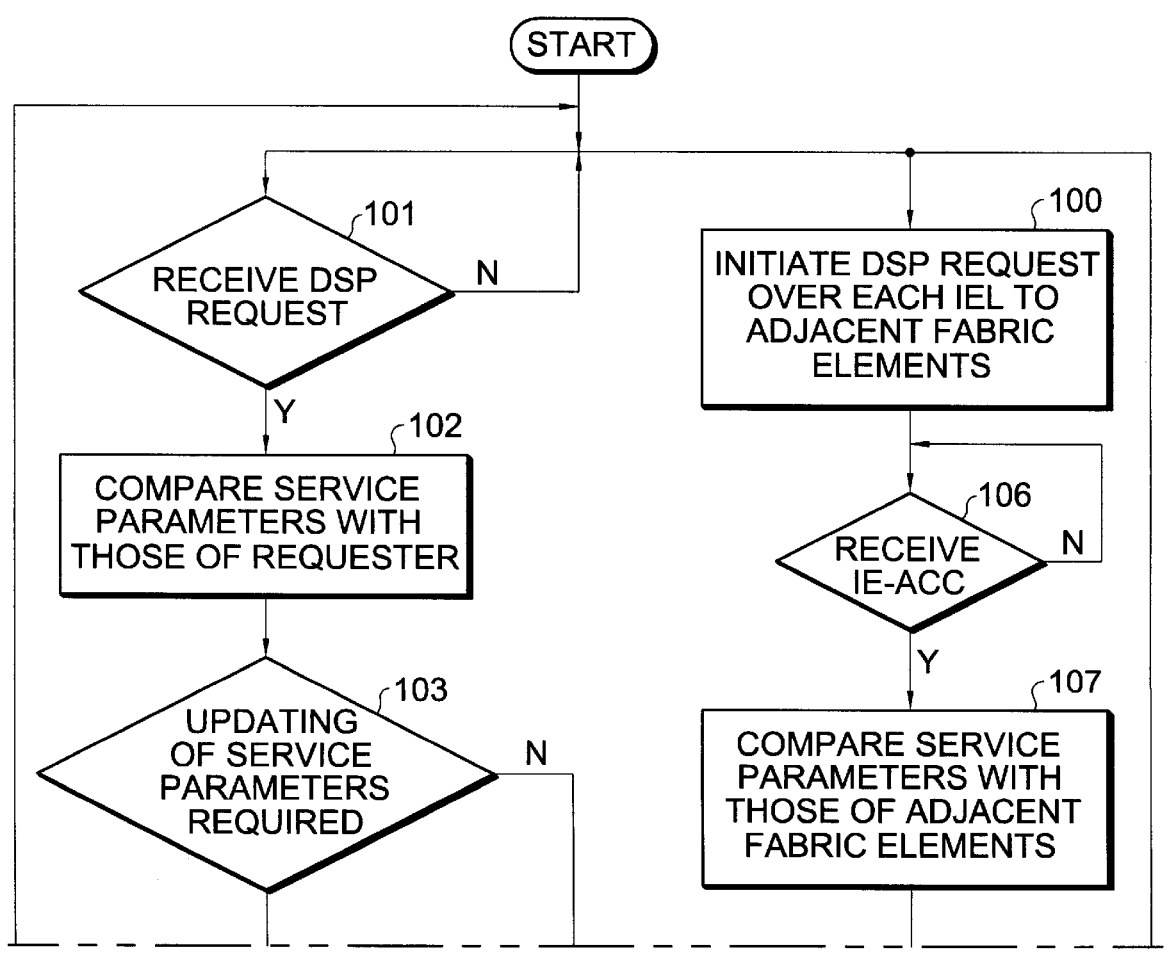
Figure 11B:
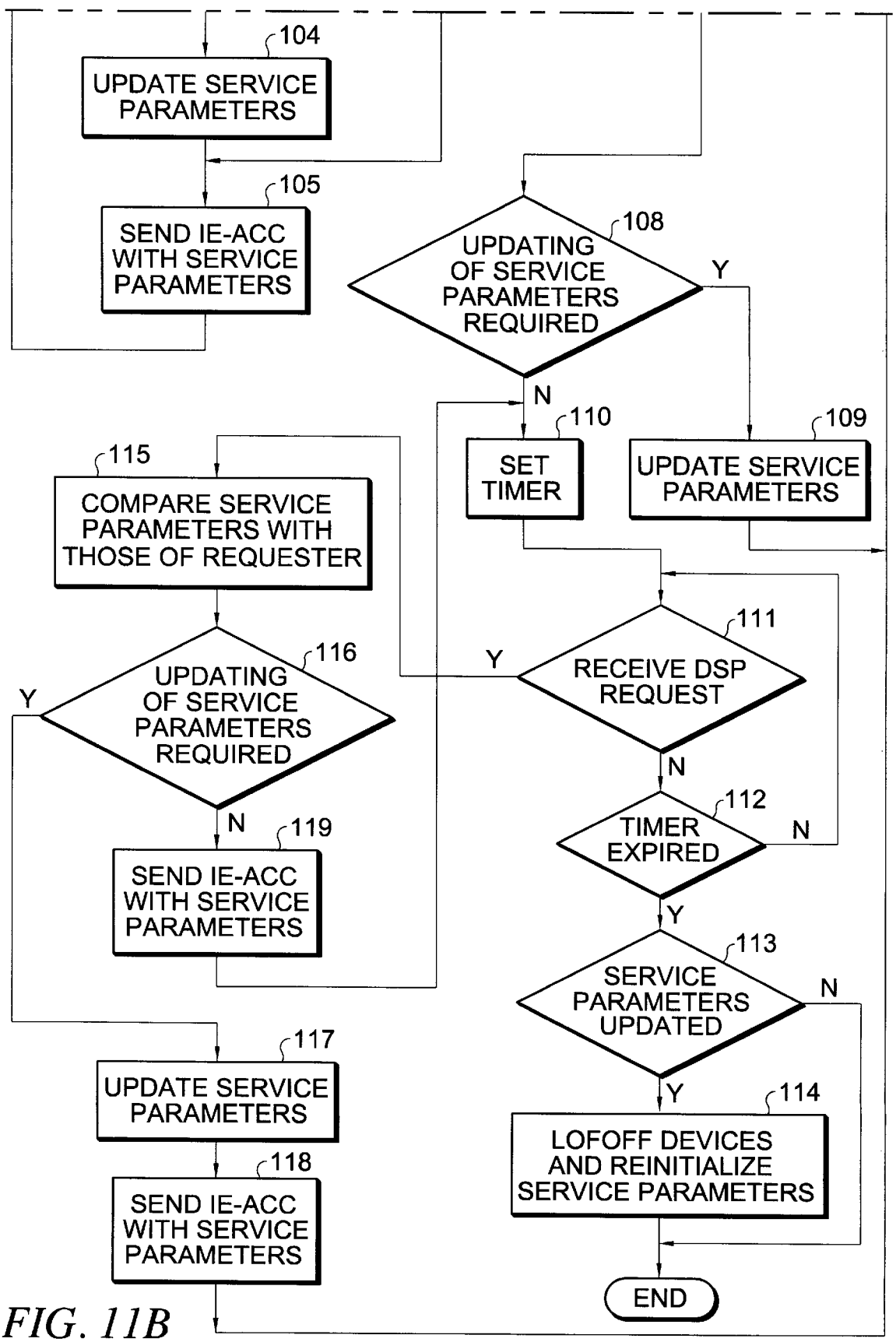

FIG. 11 is a flowchart of one method for implementing the DSP procedure within each fabric element. This flowchart is provided merely for illustrative purposes, and it should be understood that the DSP procedure can be implemented in a number of other ways. As discussed above, the DSP procedure does not require synchronization between the fabric elements. Thus, when the method begins at initialization, it can respond to DSP request from another fabric element as shown in step 101, or can initiate its own DSP request as shown in step 100, depending on the relative timing of the initialization of the fabric elements. When a DSP request is received prior to the host fabric element initiating its own DSP request, the method proceeds to step 102 wherein the service parameters of the host fabric element are compared with those of the DSP requester. In step 103, a determination is made as to whether the service parameters of the host fabric element should be updated as a result of the DSP request. When no updating is required, the method proceeds to step 105 wherein an IE__ACC data frame is sent specifying the service parameters of the host fabric element. When it is determined at step 103 that the service parameters of the host fabric element should be updated, the method proceeds to step 104 wherein the updating occurs. The method then proceeds to step 105 wherein an IE__ACC data frame is sent to the requesting fabric element specifying the updated service parameters of the host. The method then returns to the initial stage, wherein it can respond to another DSP request, or can initiate its own DSP request in step 100.

After initialization, the host fabric element initiates its own DSP request at step 100. The host then waits, at step 106, to receive an IE__ACC data frame from the responding fabric element, and when it is received, proceeds to step 107 wherein the service parameters of the responding fabric element are compared with those of the host. In step 108, a determination is made as to whether the service parameters of the host will be updated in response to the IE__ACC data frame, and when they will, the method proceeds to step 109 wherein the updating occurs. After the service parameters are updated at step 109, the method returns to step 100 wherein a new DSP request is issued with the updated service parameters. When it is determined at step 108 that no updating was required, the method proceeds to step 110 wherein a timer is set to establish a time period during which it is expected that another DSP request will be received if the DSP procedure has not reached a stable state. At step 111, a check is made to see whether another DSP request has been received, and when one has not been received, the method proceeds to step 112 to determine whether the timer has expired. If the timer has not expired, the method returns to step 111. In this manner, the method continually checks for a new DSP request, and if none is received before the timer expires, the method proceeds to step 113. At step 113, a determination is made as to whether the host service parameters were updated by the method, and if they were not, the method terminates. When it is determined at step 113 that the service parameters of the host were updated during that DSP procedure, the method proceeds to step 114 wherein the host fabric element and its associated devices are taken off-line and reinitialized with the new service parameters.

When it is determined at step 111 that a new DSP request has been received before the expiration of the timer, the method proceeds to step 115 wherein the service parameters of the host are compared with those of the DSP requester. The method then proceeds to step 116 wherein a determination is made as to whether the service parameters of the host are to be updated as a result of the DSP request. When it is determined at step 116 that the service parameters should be updated, the method proceeds to step 117 wherein the updating occurs, and then to step 118 wherein the IE_ACC data frame is sent with the updated service parameters. After sending the IE_ACC data frame at step 118, the method returns to step 100 wherein a new DSP request is issued with the updated service parameters. When it is determined at step 116 that the service parameters need not be updated, the method proceeds to step 119 wherein an IE_ACC data frame is sent with the host's service parameters. After sending the IE_ACC data frame at step 119, the method returns to step 110 wherein the timer is set and the host waits for another DSP request, or detection of the stable condition.

As discussed above, one embodiment of the invention determines a unique name for each fabric and region by adopting the name of a single fabric element for each. If the fabric element that provides the name to a fabric or region becomes inactive or is removed from the system, it is desirable to rename the associated fabric or region. Therefore, in one embodiment of the invention, a technique is provided to detect when a fabric element that provides the name for a fabric or region becomes inactive or is removed from its corresponding fabric or region.

Each fabric element that provides the name for a fabric or region periodically transmits a validate name (VN) data frame to its adjacent fabric elements. In one embodiment of the invention, VN data frames are transmitted by each name providing fabric element every 0.5×Min. R A_TOV. The VN data frame includes the name of the name provider, a time field indicating a time at which the frame was sent, and a distance field. The time and distance fields can be considered to be fabric and region service parameters, but an updating of these parameters does not trigger transmission of a DSP request. The time field is set to zero for the first VN data frame sent by a name provider, and is incremented for each subsequent VN data frame. The distance field is set to zero by the name provider, and is updated by other fabric elements in a manner described below. The time field is not updated by other fabric elements.

Whenever a VN data frame is received by a fabric element, it returns an error signal if the fabric or region name is invalid. If the VN data frame is valid, the receiving fabric element compares the information contained therein against two of its service parameters, and depending upon the result of those comparisons, takes any of various actions as shown in FIG. 15. Each fabric element stores a "Service parameter Time" (FIG. 15) which relates to the time at which a previously received VN data frame was sent by the name provider, and a "Service parameter Distance" (FIG. 15) which relates to the lowest number of fabric elements through a previously received VN data frame passed before reaching the fabric element. Whenever a VN data frame is received, the Service parameter Time for the recipient is compared with the time at which the newly received VN frame was sent by the name provider (designated as "VN frame Time" in FIG. 15). If the Service parameter Time is greater than the VN frame Time for the newly received VN data frame, it indicates that the newly received VN frame is stale. Thus, no action is taken in response to its receipt.

When a VN data frame is received by a fabric element, another comparison made is the Service parameter Distance versus the VN frame Distance plus one. The VN frame Distance designates the distance that the VN frame travelled from the name provider to reach the fabric element adjacent the one receiving the VN frame. When it is determined that the VN frame Time equals the Service parameter Time, and further that the VN frame Distance plus one is greater than or equal to the Service parameter Distance, it indicates that that VN data frame was transmitted at the same time as one already received by the fabric element, and traversed a path that was at least as long as the path traversed by the previously received VN data frame. Thus, the newly received VN data frame is stale, and no action is taken by the receiving fabric element.

When it is determined that the VN frame Time equals the Service parameter Time, and further that the VN frame Distance plus one is less than the Service parameter Distance, it indicates that the newly received VN data frame was transmitted at the same time as a previously received frame, but has traversed a shorter path. When such a data frame is received, the receiving fabric element updates its VN service parameters (i.e., Service parameter Time and VN frame Distance) in the manner shown in FIG. 15. As a result, the VN service parameters identify the shortest path between the name provider and the receiving fabric element, which is useful for reasons described below. Furthermore, the receiving fabric element also transmits a VN data frame over each of its associated IELs. The VN frame Time for the transmitted VN frames is the same as that of the received data frame, and the VN frame Distance is incremented by one.

Finally, when the VN frame Time is greater than the Service parameter Time, it indicates that the received data frame is a new VN data frame that was transmitted subsequent to the previously received one. In response, the fabric element again updates its VN service parameters and re-transmits VN data frames over its associated IELs, with the VN frame Time being equal to that of the newly received VN frame, and the VN frame Distance being incremented by one.

Each fabric element considers the name provider to have become inactive if a new VN data frame is not received from the name provider within a specified time period following receipt of a previous VN data frame. In one embodiment of the invention, this time period equals the fabric element's Service parameter Distance times R_A_TOV. When the Service parameter Distance is used to establish this time period, it is desirable for this parameter to reflect the shortest path between the host fabric element and the name provider. Thus, whenever a VN frame is received that was transmitted by the name provider at the same time as a previously received VN frame but has travelled a shorter path, the Service parameter Distance is updated to reflect the shorter path as discussed above.

After the time period has expired without a new VN frame having been received, the fabric element responds as busy to any DSP request relating to the fabric or region that has adopted the name of the suspected inactive fabric element. The fabric element responds as busy to ensure that a race condition does not develop if some fabric elements are waiting for a DSP request to become stable for a fabric or region, while others are waiting for the VN time period to expire for the same fabric or region. After establishing itself as busy, the fabric element waits an additional time period of 2×Service parameter Distance×R_A_TOV to confirm the inactive status of the name provider. When the inactive status has been confirmed, the fabric element changes all of its fabric-wide or region-wide service parameters associated with the inactive name provider to their power-up default values. This results in the initiation of a new DSP procedure, in which a new fabric element is chosen as the name provider for the fabric or region.

Address Partitioning

As discussed above, Fibre Channel supports four different addressing modes for determining a unique address for each port in the system. In two of these modes, the addresses are automatically assigned. In one embodiment of the invention, the fabric elements in the system assign unique addresses to each port using a procedure that is similar in some respects to the DSP procedure discussed above.

It has previously been proposed to partition the Fibre Channel node addresses using a three level hierarchy, including a domain identifier (domain_ID) at the highest level, an area identifier (area_ID) at the intermediate level, and a port identifier (port_ID) at the lowest level. For example, for a system that employs a 24-bit node address, the most significant byte can be assigned to the domain_ID, the middle byte to the area_ID, and the least significant byte to the port_ID. This hierarchical address partitioning is analogous to the numbering scheme used for telephones in North America, which employs a 10-digit number having three hierarchical levels. The telephone area code is analogous to the domain_ID in Fibre Channel, the middle three digits are analogous to the area_ID, and the last four digits are analogous to the port_ID.

FIG. 12 provides an illustrative assignment of addresses using a 24-bit address field wherein the most significant eight bits specify the domain_ID, the middle eight bits specify the area_ID, and the low order eight bits specify the port_ID. If the entire 8-bit domain_ID field was used for port addresses, it would support $2^8$ or 256 distinct domains. However, in the illustrative embodiment of the invention shown in FIG. 12, the following domain$_{13}$ ID bit assignments are reserved or assigned to special functions: "00000000"; "11110xxx"; "111110xx"; "1111110x"; "11111110"; and "11111111". Each of the other domain$_{13}$ ID bit assignments are used for port identifiers.

All area_ID and port_ID bit assignments within the above-referenced domains are also reserved or assigned to special functions. Additionally, within each of the domains available for assignment to port addresses, a group of addresses is reserved to assist in the implementation of certain fabric assisted functions. The reserved addresses are designated in FIG. 12 by the following notation: (Domain_ ID) 1111 (Special_ID). As this notation indicates, within each domain available for assignment to port addresses, all the bit assignments within area_IDs 1111xxxx are reserved, providing 978,944 address assignments to assist in implementing fabric assisted functions. This particular partitioning is provided merely for illustrative purposes, and it should be understood that the number of address assignments reserved or assigned to special functions can vary.

Other than the special cases discussed above, the other bit assignments are used to identify the ports in the Fibre Channel system with unique 24-bit addresses. The area ID field includes eight bits, providing 256 unique bit assignments. However, since sixteen bit assignments within each domain are used for fabric assisted functions as discussed above, only 240 unique areas are available within each domain. Because the port_ID include eight bits, each area includes 256 distinct port addresses.

In one embodiment of the invention, addresses are assigned to each port in the system by a series of address managers. The address managers include: one master domain address manager (MDAM) for each fabric; one master area address manager (MAAM) and one domain address manager (DAM) for each domain; one master port address manager (MPAM) and one area address manager (AAM) for each area; and one port address manager (PAM) for each port address. Following initialization, the address managers function to collectively assign a unique address to every port in the system. Each of the address managers is implemented in a single fabric element. Thus, a fabric element that supports either automatic or directed address assignment should support the functions of each of the above-described address managers.

One function of the MDAM is to assign a new domain_ ID bit assignment to each newly created domain. The MDAM maintains a list of which domain_ID bit assignments it has previously assigned. The MDAM also detects the absence of a once active domain, and makes the corresponding domain_ID available for reassignment. New domains are created in response to requests received from fabric elements as described below. The MDAM also functions as the DAM for the domain of the port addresses for the fabric element in which the MDAM is implemented.

Each domain has an associated DAM and MAAM, which are implemented in the same fabric element. One function of the DAM is to communicate with the MDAM to ensure that it remains active. This function is described more fully below. If the MDAM becomes inactive, a new one is selected. The MAAM is responsible for assigning a new area ID bit assignment for every newly created area within its associated domain, much like the MDAM is responsible for assigning new domains. New areas are created in response to requests received from fabric elements. The MAAM also detects the absence of a previously active area, and makes the corresponding area_ID available for reassignment. The MAAM functions as the AAM for the area of the port addresses for the fabric element in which the MAAM is implemented.

Each area has an associated AAM and MPAM, which are implemented in the same fabric element. Each AAM detects the absence of the MAAM for its area, and when it becomes non-functional, a new MAAM is selected. The MPAM is responsible for assigning a new port_ID bit assignment for every newly created port address within its associated area, much like the MDAM and MAAM respectively assign new domains and areas. New port_IDs are assigned in response to requests received from fabric elements. The MPAM also detects the absence of ports and makes their identifiers available for reassignment. The MDAM also functions as the PAM for the port_IDs assigned to the ports in the fabric element in which the MPAM is implemented.

One PAM is active for each assigned port_ID. The PAM assigns the port_ID to its associated port. Each PAM also detects the absence of the MPAM and when it becomes non-functional, a new MPAM is designated.

The address managers collectively assign addresses to the ports in the system in the following manner. When the system is initialized, one fabric element for each fabric is designated as the master. The master fabric element includes the MDAM for the fabric. The MDAM initially has control over the assignment of each of the available 24-bit port addresses for the fabric. In one embodiment of the invention, the master fabric element for each fabric is selected to be the one whose ID name was adopted as the fabric name during the DSP procedure. However, it should be understood that a master fabric element can be determined for each fabric in other ways.

Initially, the master fabric element assigns 24-bit addresses to each of its ports. The assigned addresses necessarily include at least one domain_ID bit assignment, at least one area_ID bit assignment and at least one port_ID bit assignment. Thus, the master fabric element implements a number of address managers. In its capacity as the MDAM, the master fabric element selects a domain_ID to establish a domain to which its port addresses will belong. In doing so, the master becomes the DAM and MAAM for that domain. In its capacity as the MAAM for the domain, the master fabric element also selects an area_ID to establish an area to which its port addresses will belong. In doing so, the master becomes the AAM and MPAM for that area. In its capacity as the MPAM for the area, the master fabric element selects port_IDs for each of its ports, and becomes the PAM for each port by assigning an address to each port.

For example, if the master fabric element assigns addresses having hexadecimal values "010000" and "010001" to two of its ports, the master is designated as the MDAM for the fabric, the DAM and MAAM for domain_ ID "01", the AAM and MPAM for area_ID "00" within domain "01", and the PAM for port_IDs "00" and "01" within domain "01" and area "00".

After the master fabric element assigns addresses to its own ports, addresses are next assigned to the ports of its adjacent fabric elements, then to the fabric elements adjacent to those, and so on. Addresses are not assigned to the ports of a fabric element until the fabric element issues a request for addresses. When the system is initialized, every port in the system is assigned a common address. Through an established address communication protocol, the fabric elements communicate with each other over the IELs connecting their E_Ports. When a fabric element detects that the address of the E_Port of its adjacent fabric element is equal to the initialized address, the fabric element recognizes that valid addresses have not yet been assigned to the ports of that fabric element. Thus, the fabric element recognizes that there are no address managers in its adjacent fabric element to handle a request for the assignment of addresses, and therefore, no request is made. A fabric element does not make a request for an assignment of addresses for its ports until it detects a valid address on un E_Port of one of its adjacent fabric elements, indicating that the adjacent fabric element has at least one address manager for handling such a request.

After the master fabric element has assigned addresses to each of its ports, the fabric elements adjacent the master will detect valid addresses on its E_Ports. Each of the adjacent fabric elements then requests a certain number of addresses. The number of addresses requested will be equal to at least the number of ports in the requesting fabric element, and may include a number of additional addresses.

A number of options are available to a fabric element in requesting addresses for assignment to its ports. The fabric element can request that it be provided with addresses within a domain and area that have already been created, in which case only new port_ID bit assignments need be determined. For example, the fabric elements adjacent the master can request addresses within the same domain and area as the addresses already assigned by the master to its own ports. When such a request is received by the master fabric element, it acts in its capacity as the MPAM for the area, and selects the requested number of previously unassigned port_IDs and transfers them to the requester. The requesting fabric element then implements a PAM for each of its ports and assigns one address to each of the ports.

Another option for a fabric element is to request addresses that are in a domain that has already been established, but that establish a new area. For example, the fabric elements adjacent the master can request addresses within the same domain as the addresses already assigned by the master to its own ports, but within a new area. When such a request is received by the master fabric element, it acts in its capacity as the MAAM for the domain by selecting a previously unassigned area_ID and transfering it to the requester. The requesting fabric element becomes the AAM and MPAM for the newly created area. As the MPAM, the fabric element controls the selection of the port_IDs within the newly created area. Initially, the fabric element implements a PAM for each of its ports, and assigns each port a unique address within the area. Any unused port_IDs within the area are available for assignment to other fabric elements, under the control of the fabric element in its capacity as the MPAM for the area. After the fabric element adjacent the master has assigned addresses to its ports, its adjacent fabric elements will detect valid addresses on its ports, and may request an assignment of addresses within the same area. In its capacity as the MPAM for the area, the fabric element can respond to such requests by selecting the requested number of previously unassigned port_IDs in the area and transferring them to the requester, which then implements a PAM for each port by assigning one of the addresses to each.

Another option for a fabric element is to request addresses that are in a new domain, i.e., a previously unassigned domain. All such requests are ultimately handled by the MDAM in the master fabric element. When it receives such a request, the MDAM selects a previously unassigned domain_ID and transfers it to the requester. The fabric element that receives the new domain_ID then selects an area within the domain, and a group of port addresses within the area for assignment to its fabric element ports. In doing so, the fabric element becomes the DAM and MAAM for the domain, the AAM and MPAM for the area, and the PAM for each of its ports.

Figure 13:
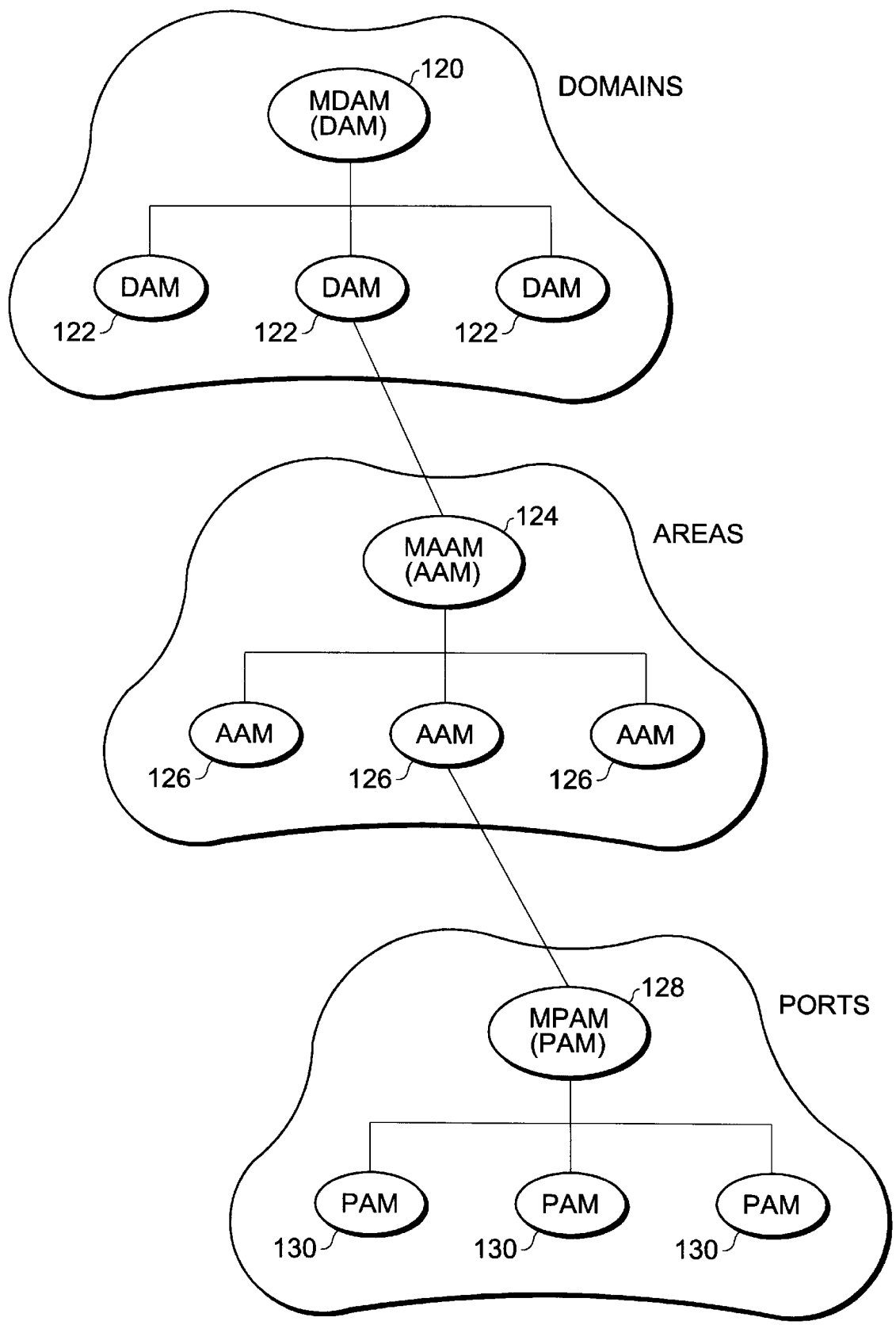
FIG. 13 is a hierarchical representation of address partitioning using domains, areas and ports as well as address managers for each.

As should be appreciated from the foregoing, the present invention provides a hierarchy of address managers for assigning addresses to ports within a Fibre Channel system. This hierarchy is shown conceptually in FIG. 13. Each fabric includes a single MDAM 120 that determines which domain_IDs have been assigned and selects an unused domain_ID when a new domain is created. Each domain includes a corresponding DAM 122 and MAAM 124. The MAAM determines which area_IDs have been assigned in the domain and selects an unused area_ID when a new area is created within the corresponding domain. Each area within a domain includes a corresponding AAM 126 and MPAM 128. The MPAM determines which port_IDs have been assigned and selects an unused port_ID when a new port is created within the corresponding area. Each port also includes a corresponding PAM 130 which controls the assignment of a port_ID to that port. As shown in FIG. 13, the MDAM 120 also acts as a DAM for at least one domain, the MAAM 124 acts as an AAM for at least one area, and the MPAM 128 acts as a PAM for at least one port.

As seen from the foregoing, the present invention provides a technique for automatically partitioning and assigning unique addresses to the ports of a Fibre Channel system. This technique employs address managers that control the selection and assignment of the port addresses. At initialization, the selection and assignment of every port address is controlled by a single fabric element (i.e, the MDAM). Through communication with other fabric elements in the system having ports to which an address is to be assigned, the MDAM transfers control of certain address ranges to other fabric elements, which become address managers for those address ranges. In this manner, the assignment and control of every port address is always under the control of a single fabric element, so that the addresses can be automatically assigned to every port in the system.

The manner in which data frames are routed in Fibre Channel places some limitations on the manner in which port addresses can be assigned. When the above-described hierarchical addressing scheme is employed, routing of data frames between two port addresses is also done in a hierarchical fashion. When a data frame is transmitted from a first port and to a second port that is in a different domain, the frame is routed in three stages. The first routing stage is to route the data frame through the fabric from the domain of the first port to the domain of the second. In doing so, the data frame may be routed to at any port having an address within the second domain. Once the data frame arrives within the destination domain, the second stage is to route the frame from the area in which it arrives to the area of the destination, while remaining within the destination domain. The data frame is routed to the destination area using only ports that all have the same domain_ID as the destination port. Routing between areas similarly results in the data frame arriving, without restriction, at any port within the destination area. Once the data frame arrives in the area of the destination, the last stage involves routing the data frame to the destination port, while remaining within the destination area.

Figure 7A:
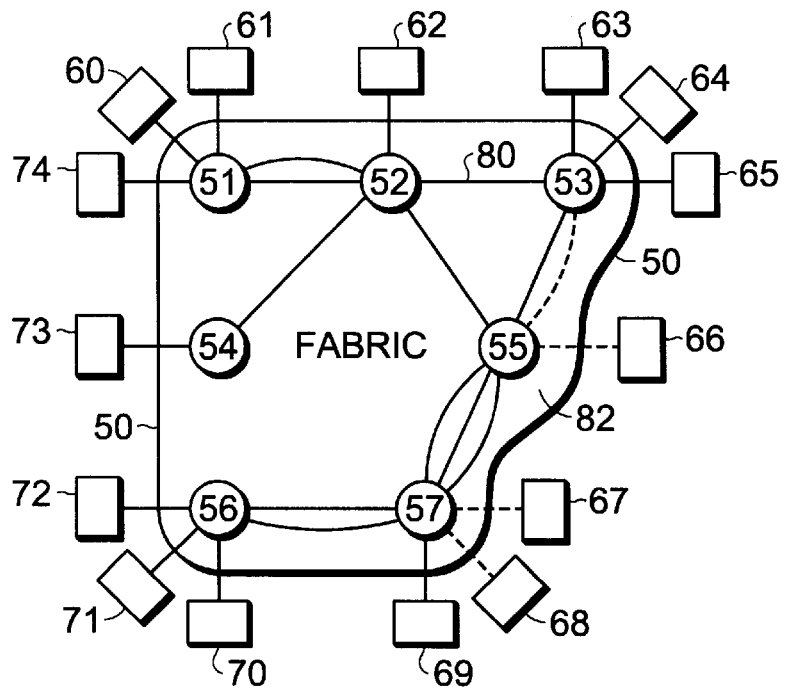
FIGS. 7(a)–(f) show the manner in which subfabrics, regions and extended regions can be formed for a single fabric.
Figure 7B:
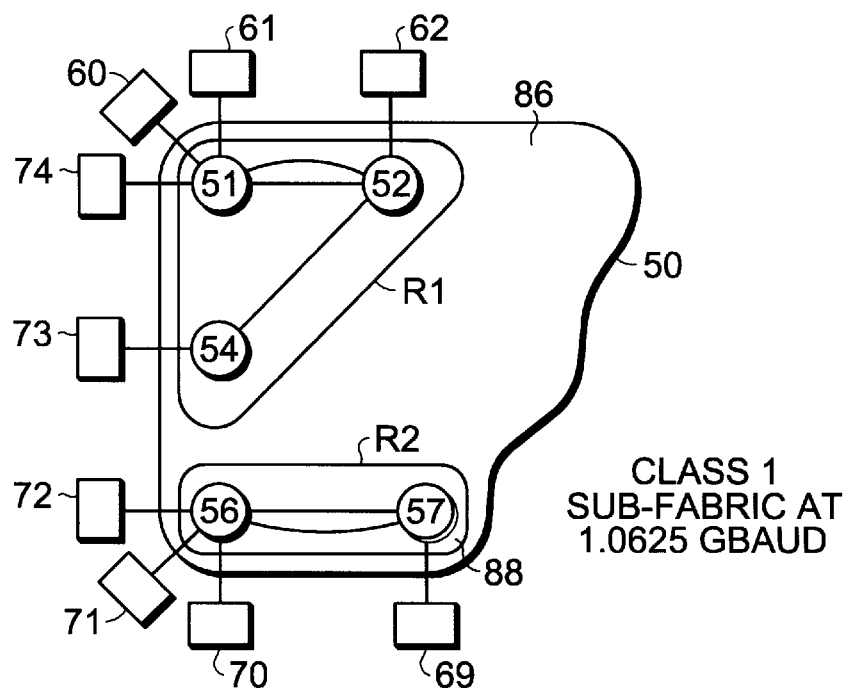
Figure 7C:
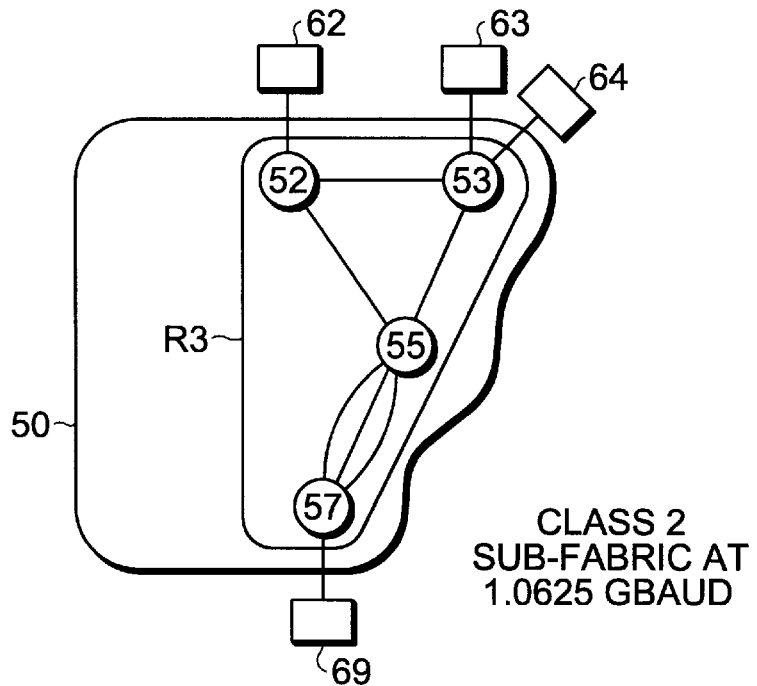
Figure 7D:
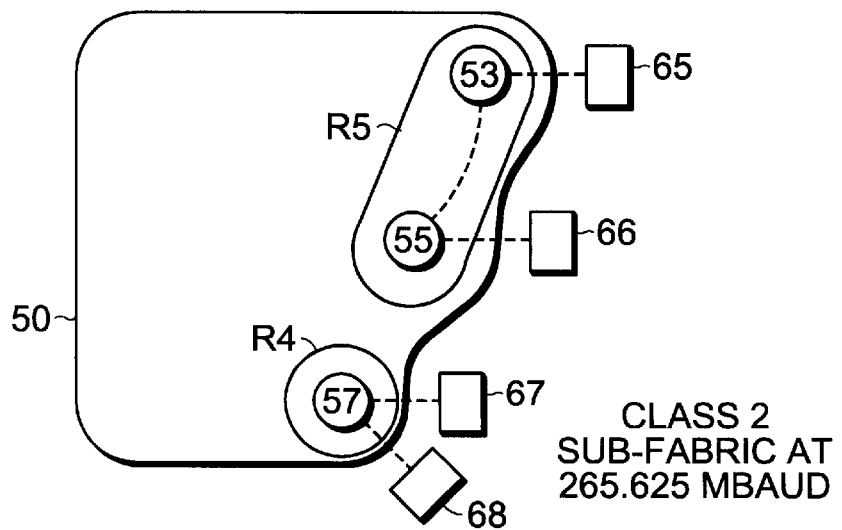
Figure 7E:
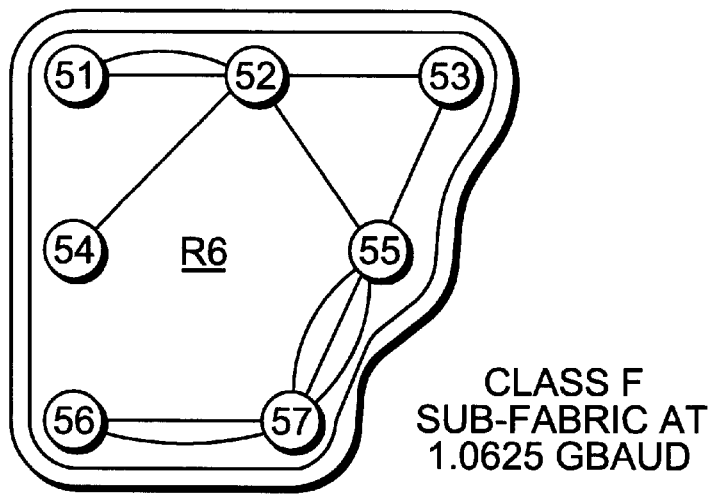
Figure 7F:
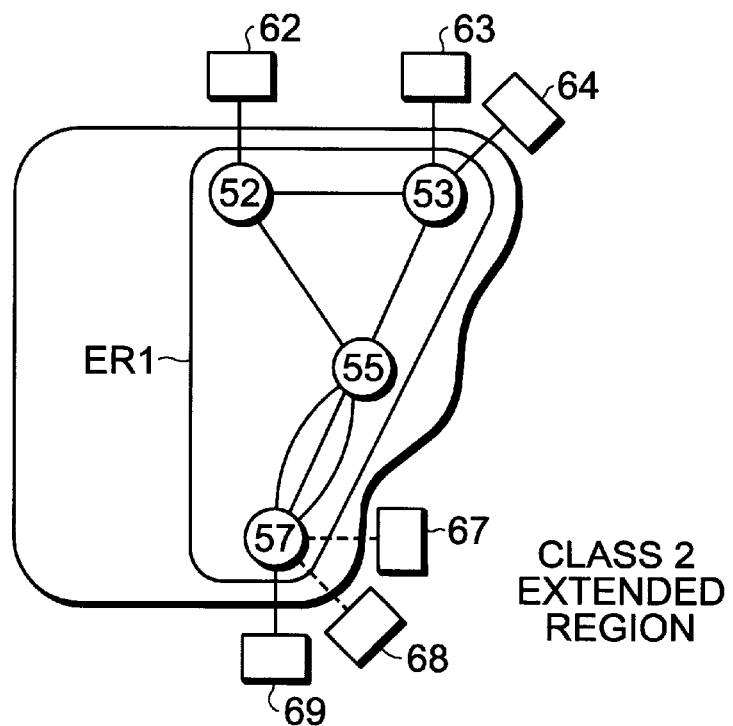

Data frames are only routed between ports that are in a common region, using the service class and data rate supported by the region. Thus, some restrictions are placed on the manner in which port addresses can be assigned in view of the fact that data frames routed within any particular domain or area must remain within the domain or area. Referring to FIG. 7(c), an example is provided to assist in illustrating the restrictions placed on address assignments. In FIG. 7(c), fabric elements 52 and 57 are each part of a common region R3. However, there is no direct communication link between these two fabric elements, and any data frame routed between them must pass through fabric element 55. In view of the requirements discussed above, fabric elements 52 and 57 cannot be grouped within the same domain or area unless fabric element 55 is also included in that domain or area, because otherwise data frames routed between fabric elements 52 and 57 would not stay within a single domain or area. Generally stated, no two fabric elements that belong to a common region should be grouped in a single domain or area unless there is a path between them that is both part of the same region (or extended region), and the same domain or area. Furthermore, each fabric element is restrained to being within a single domain, but may span multiple areas within the domain. Domains and areas may span multiple regions, as long as the above-described restriction is satisfied.

As discussed above, the address partitioning scheme of the present invention begins by designating a single master fabric element as the MDAM, and by the master assigning addresses to its ports. All the other fabric elements in the system receive addresses for assignment to their ports in response to a request for addresses. Each request includes the region IDs of the ports to which the addresses will be assigned. This information is used to ensure that the restriction discussed above regarding ports within a common domain or area being connected by at least one path through a single region is satisfied. To further assist in ensuring that this restriction is satisfied, the MPAM for each area includes a list of all region_IDs for ports that have been assigned an address within that area, and the MAAM for each domain includes a list of all region_IDs for the ports that have been assigned an address in that domain.

If a fabric element requests an assignment of addresses within the same domain or area as its adjacent fabric element, a check is done to ensure that the above-described restriction is not violated. The request is initially processed by the adjacent fabric element whose newly assigned addresses prompted the request. That fabric element compares the list of region_IDs for the requester with its own. If the requester's region_IDs do not include any regions other than those included in the adjacent fabric element that processes the request, it is ensured that the above-described restriction will not be violated, because a communication path necessarily exists between the adjacent fabric elements in each of the requested regions. Therefore, if the requested number of addresses is available in the designated domain or area, the request will be granted by the MAAM or MPAM for the domain or area. If the MAAM or MPAM resides in the adjacent fabric element, it will simply handle the request by selecting the available addresses and forwarding them to the requesting fabric element. If the appropriate address manager is not implemented in the adjacent fabric element, that fabric element forwards the request to the address manager in the manner described below.

If the comparison in the adjacent fabric element of its region_IDs with those of the address requester indicates that the requester seeks addresses for any region that is not supported by the adjacent fabric element, these region_IDs are forwarded along with the request to the appropriate address manager. The address manager for a domain or area includes a list of all regions to which addresses in the domain or area have previously been assigned. If a fabric element that requests addresses within an existing domain or area includes a new region to which no addresses in the domain or area has previously been assigned, the request will be granted if the requested number of addresses is available. However, if the requester includes a region that is in the master's list, but that is not supported by the fabric element adjacent the requester, the request will be denied because no path would exist between at least one of the requester's ports and an existing port that is in the same region and the requested domain or area. Thus, the requester is assigned addresses within a new domain.

As should be appreciated from the foregoing, requests for addresses within an existing domain or area are directed to the requester's adjacent fabric element, so that the region_

IDs of the requester can be checked against those of its adjacent fabric element.

When a fabric element seeks addresses within a new domain, the above-described checking need not be performed. A request for a new domain is directed to the DAM of the adjacent fabric element whose newly assigned addresses prompted the request. Every DAM stores the address of the MDAM. Therefore, when a DAM receives a request for addresses in a new domain, it directs the request to the MDAM. Each of the established DAMs periodically polls the MDAM to ensure that it remains active. If it is detected that the MDAM has become inactive, a new MDAM is established. Similarly, the AAM and PAMs respectively poll the MAAM and MPAM to ensure that they remain active, and if either becomes inactive, a new one is established.

The address managers are assigned fixed addresses so that an address request directed to a particular address manager can be routed to that address manager if it is not implemented in the fabric element that initially receives the request. As shown in FIG. 12, the domain address managers are assigned hexidecimal addresses at FFFC (domain_ID). Thus, a request for new addresses within any domain can be routed to the appropriate domain address manager from any fabric element in the system. The area address managers within any domain are assigned hexidecimal addresses FFPD (area_ID). The area address managers with any domain can only be accessed from a port address that is within that domain. The port address managers within any area are assigned hexidecimal address FFFE (port_ID), and can similarly only be accessed from a port having an address within the appropriate area. The above-described specific address assignments for the domain, area and port address managers are provided merely for illustrative purposes, and it should be understood that other address assignments can alternatively be provided. The assignment of unique addresses to the address managers enables them to be accessed from any fabric element in the system.

Figure 14:
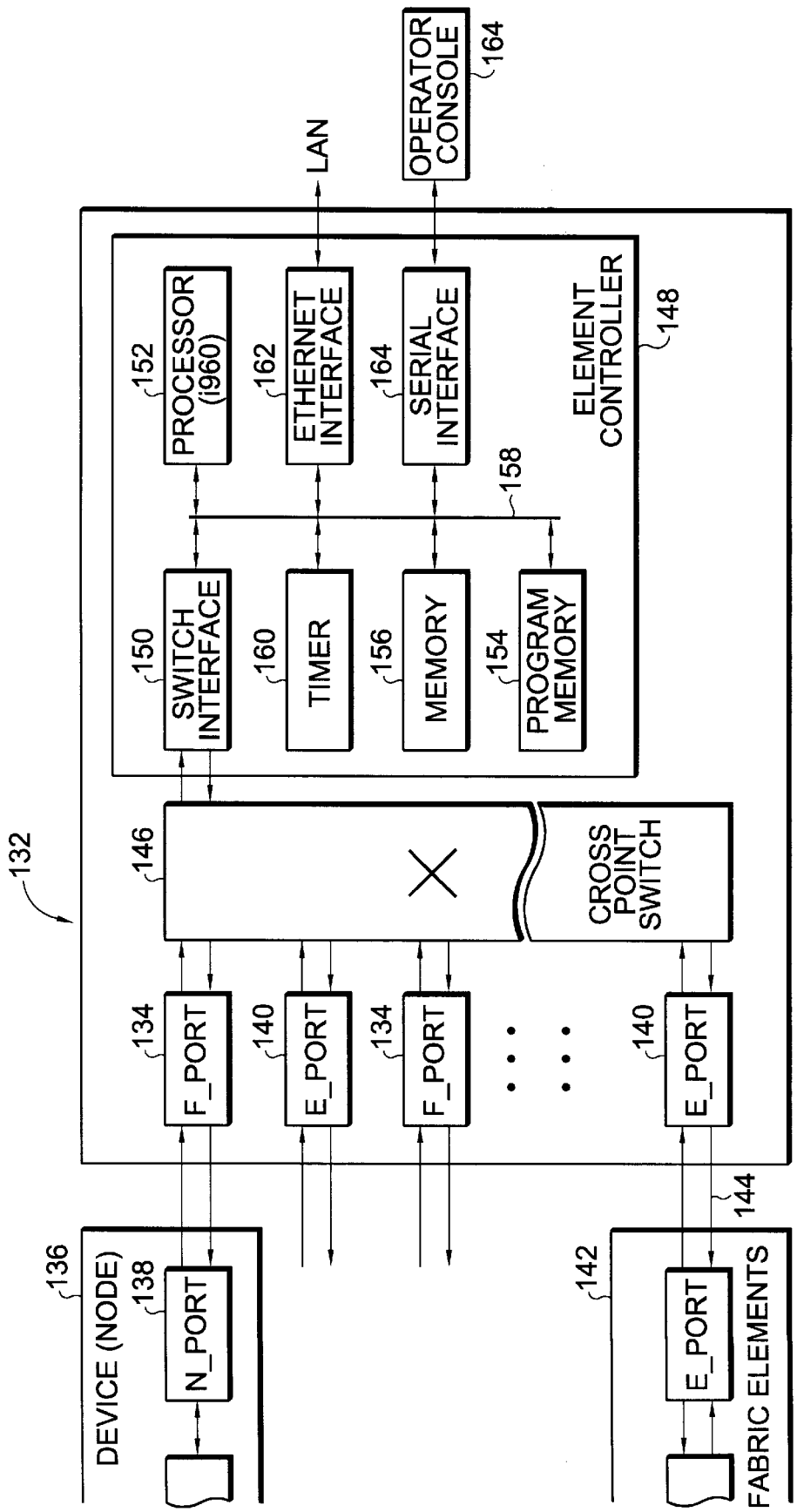
FIG. 14 is a block diagram of an illustrative fabric element.

FIG. 14 is a block diagram of an illustrative fabric element 132. The fabric element has a plurality of ports, including an F_Port 134 for connection to a device 136 via an N_Port 138, and a plurality of E_Ports 140, one of which is shown as being connected to another fabric element 142 via an IEL 144. The fabric element 132 includes a cross-point switch 146 for switching between its ports. The switch 146 is connected to an element controller 148 via a switch interface 150. The element controller includes a processor 152 that is connected to a program memory 154 and a memory 156 via a bidirectional bus 158. The processor can be an Intel i960 processor, or one of a variety of other processors. The element controller 148 also includes a timer 160 for implementing various timing functions, an ethernet interface 162 for connection to a local area network (LAN) to allow for remote access, and a serial interface 164 for connection to an operator console 166.

As discussed above, the DSP procedure and the address partitioning techniques of the present invention are implemented by the fabric elements that are disbursed throughout the system. These techniques can be implemented in one or more software programs stored in the program memory 154, and executed on the processor 152, within each fabric element controller 148.

It should be understood that various changes and modifications of the embodiments shown in the drawings and described in this specification may be made within the scope of the invention. For example, although the DSP procedure and the address partitioning techniques are described above as being implemented in a system of fabric elements, it should be understood that these techniques can be also employed with systems having other types of distributed components, such as other types of switches or devices. It is intended that all matter contained in the above-description and shown in the accompanying drawings be interpreted in an illustrative and not in a limiting sense.

What is claimed is:

1. A method for automatically assigning a unique address to each port in a system including a plurality of interconnected components, each component having a plurality of ports, the method including the steps of:

establishing a range of addresses available for assignment to ports, wherein the range of available addresses includes a plurality of domains and areas, each domain including a plurality of areas, each area including a plurality of addresses;

granting initial control over the range of available addresses to a first component;

assigning unique port addresses from the range of available addresses to the ports of the first component, wherein the step of assigning unique port addresses to the ports of the first component includes assigning addresses within a first domain and a first area of the first domain to the ports of the first component;

transferring control over a first subset of the range of available addresses from the first component to a second component;

assigning unique port addresses from the first subset of the range of available addresses to the ports of the second component;

establishing the first component as a domain address manager in control of assigning addresses within the first domain, and as an area address manager in control of assigning addresses within the first area of the first domain;

assigning predetermined addresses to the domain address manager for the first domain and the area address manager for the first area of the first domain so that they can be addressed by other components in the system;

directing any request for an address within the first domain to the first component as the domain address manager for the first domain; and directing any request for an address within the first area of the first domain to the first component as the area address manager for the first area of the first domain.

2. The method for automatically assigning a unique address to each port in a system including a plurality of interconnected components as recited in claim 1, wherein the first subset of the range of available addresses is within a second area of the first domain, and wherein the method further includes the steps of:

J. establishing the second component as an area address manager in control of assigning addresses within the second area of the first domain;

K. assigning a predetermined address to the area address manager for the second area of the first domain so that it can be addressed by other components in the system; and L. directing any request for an address within the second area of the first domain to the second component as the area address manager for the second area of the first domain.

3. The method for automatically assigning a unique address to each port in a system including a plurality of interconnected components as recited in claim 1, wherein the first subset of the range of available addresses is within a second domain, wherein step E includes assigning addresses within a first area of the second domain to the ports of the second component, and wherein the method further includes the steps of:

J. establishing the second component as a domain address manager in control of assigning addresses within the second domain, and as an area address manager in control of assigning addresses within the first area of the second domain;

K. assigning predetermined addresses to the domain address manager for the second domain and the area address manager for the first area of the second domain so that they can be addressed by other components in the system;

L. directing any request for an address within the second domain to the second component as the domain address manager for the second domain; and M. directing any request for an address within the first area of the second domain to the second component as the area address manager for the first area of the second domain.

4. A method for automatically assigning a unique address to each port in a system including a plurality of interconnected components, each component having a plurality of ports, the method including the steps of:

establishing a range of addresses available for assignment to ports;

granting initial control over the range of available addresses to a first component;

assigning unique port addresses from the range of available addresses to the ports of the first component;

transferring control over a first subset of the range of available addresses from the first component to a second component; and assigning unique port addresses from the first subset of the range of available addresses to the ports of the second component;

wherein communication is only enabled between component ports in the system that belong to a common region, wherein the range of available addresses includes a plurality of domains and areas, each domain including a plurality of areas, each area including a plurality of addresses, wherein the system routes an information frame between a source and destination component by routing the frame from the source domain to the destination domain, then routing the frame within the destination domain to the destination area, and finally routing the frame within the destination area to the destination address, and wherein the method includes the steps of:

ensuring that no two component ports within a common region are assigned addresses within a common domain unless there is path between them that is within the common region and within the common domain; and ensuring that no two component ports within a common region are assigned addresses within a common area unless there is path between them that is within the common region and within the common area.

5. The method for automatically assigning a unique address to each port in a system including a plurality of interconnected components as recited in claim 1, further including the steps of:

determining, for each component other than the first component, whether a valid address within the range of available addresses has been assigned to at least one port of an adjacent component, and when a valid address has been assigned to at least one port of an adjacent component, transmitting a request to the adjacent component for control over a requested number of addresses;

when the request for control over a requested number of addresses seeks addresses within an existing domain that includes an address that has been assigned to a port, performing the steps of;

determining whether the requesting component supports any additional regions that are not supported by the adjacent component; and when the requesting component includes at least one additional region, determining whether any address within the existing domain has been assigned to a port within the at least one additional region, and when one has, transferring the requested number of addresses within a new domain to the requesting component, and when one has no, transferring the requested number of addresses within the existing domain to the requesting component; and when the request for control over a requested number of addresses seeks addresses within an existing area that includes an address that has been assigned to a port, performing the steps of;

determining whether the requesting component supports any additional regions that are not supported by the adjacent component; and when the requesting component includes at least one additional region, determining whether any address within the existing area has been assigned to a port within the at least one additional region, and when one has, transferring the requested number of addresses within a new area to the requesting component, and when one has not, transferring the requested number of addresses within the existing area to the requesting component.

6. A device for automatically assigning a unique address to each port in a system including the device and a plurality of other devices, each of the plurality of devices having at least one port, the device comprising a number of ports, at least one of the number of ports being coupled to one of the plurality of other devices; and a processor programmed to perform the steps of:

transmitting a request for control over a number of addresses to the one of the plurality of other devices, the number of addresses being equal to at least the number of ports, wherein there is a range of addresses available for assignment to ports, wherein the range of available addresses includes a plurality of domains and a plurality of areas, each domain including a plurality of areas, each area including a plurality of addresses, and wherein the processor is further programmed to perform the steps of:

receiving control over the requested number of addresses; and assigning one of the requested number of addresses to each of the number of ports;

when the requested number of addresses over which control is received includes addresses within a new domain that does not include any addresses that have previously been assigned, designating the device as the address manager for the new domain;

when the requested number of addresses over which control is received include addresses within a new area that does not includes any addresses that have previously been assigned, designating the device as the address manager for the new area;

responding to a request from another of the plurality of other devices for addresses within the new domain by selecting previously unassigned areas within the new domain and transferring control over the selected areas to the another of the plurality of other devices; and responding to a request from another of the plurality of other devices for addresses within the new area by selecting previously unassigned addresses within the new area and transferring control over the selected addresses to the another of the plurality of other devices.

* * * * *